(12) United States Patent
Baca et al.

(10) Patent No.: US 11,467,356 B2
(45) Date of Patent: Oct. 11, 2022

(54) RETAINED ADHESION OF A CABLE-CONNECTOR USING A PLASMA PROCESS

(71) Applicant: CORNING RESEARCH & DEVELOPMENT CORPORATION, Corning, NY (US)

(72) Inventors: Adra Smith Baca, Hickory, NC (US); Linda Sue Baker, Addison, NY (US); Ming-Huang Huang, Ithaca, NY (US); Christine Marie Mahoney Fahey, Corning, NY (US); Wageesha Senaratne, Horseheads, NY (US)

(73) Assignee: Corning Research & Development Corporation, Corning, NY (US)

( * ) Notice: Subject to any disclaimer, the term of this patent is extended or adjusted under 35 U.S.C. 154(b) by 8 days.

(21) Appl. No.: 17/060,971

(22) Filed: Oct. 1, 2020

(65) Prior Publication Data

US 2021/0109299 A1   Apr. 15, 2021

Related U.S. Application Data

(60) Provisional application No. 62/912,966, filed on Oct. 9, 2019.

(51) Int. Cl.
*G02B 6/38* (2006.01)
*G02B 6/255* (2006.01)

(52) U.S. Cl.
CPC ......... *G02B 6/3889* (2013.01); *G02B 6/2551* (2013.01)

(58) Field of Classification Search
CPC .................................................. G02B 6/3889
See application file for complete search history.

(56) References Cited

U.S. PATENT DOCUMENTS

| | | | |
|---|---|---|---|
| 6,801,809 B2 * | 10/2004 | Laske | A61N 1/056 607/122 |
| 2017/0327708 A1 * | 11/2017 | Yaguchi | C09D 127/18 |
| 2019/0162910 A1 * | 5/2019 | Gurreri | G02B 6/3809 |

FOREIGN PATENT DOCUMENTS

| CN | 107011590 A | * | 8/2017 |
|---|---|---|---|
| JP | 2001-158415 A | | 6/2001 |

OTHER PUBLICATIONS

Barreto et al., "Reduction of Plasticizer Leaching From PVC by Barrier Coatings Deposited Using DBD Processes at Atmospheric Pressure", Plasma Processes and Polymers, 2012, pp. 1208-1214.
Beltrán et al., "Infrared spectral changes in PVC and plasticized PVC during gelation and fusion," European Polymer Journal, vol. 33, No. 4, 1997, pp. 453-462.
Liston, Edward M., "Plasma Treatment for Improved Bonding: A Review", J. Adhesion, vol. 30,1989, pp. 199-218.

* cited by examiner

*Primary Examiner* — Sung H Pak
(74) *Attorney, Agent, or Firm* — Kapil U. Banakar

(57) ABSTRACT

The present disclosure relates to a plasma treatment (under atmospheric conditions or under vacuum conditions) of a jacketed cable comprising a cable jacket and a heat shrink tubing. The plasma treatment improves retention properties of an optical fiber cable assembly by imparting a permanent change on a polymer surface of the cable jacket by crosslinking, leading to eventual graphitization, that can result in a diffusion barrier layer at an interface of the cable jacket and the heat shrink tubing, which prevents or minimizes plasticizer migration and results in an environmental seal (e.g., a long-term water tight seal).

26 Claims, 14 Drawing Sheets

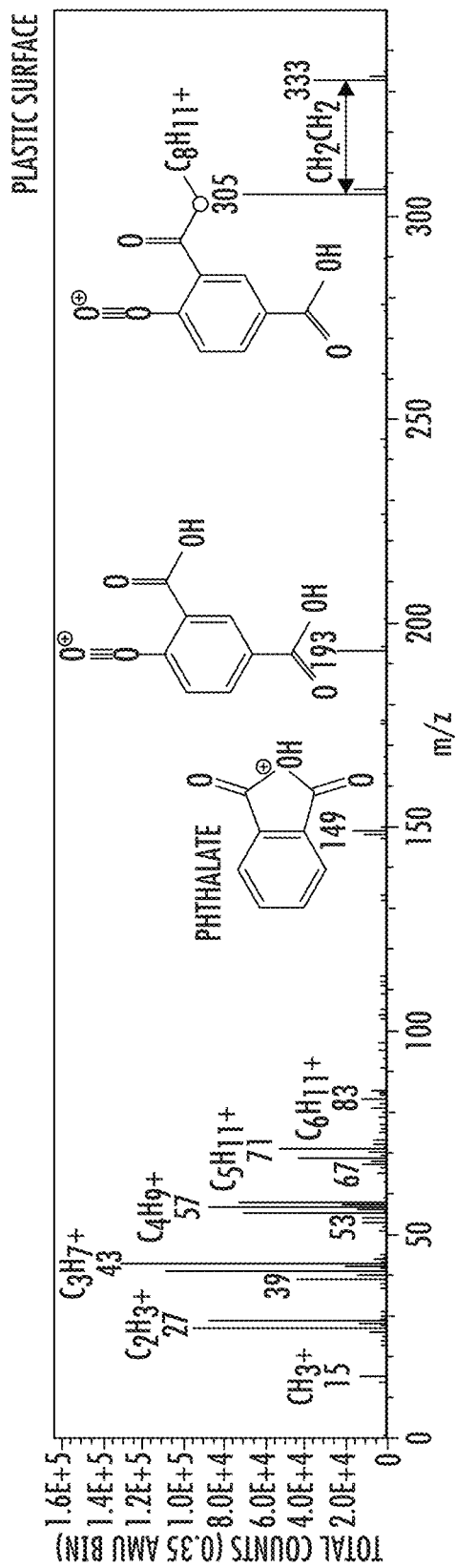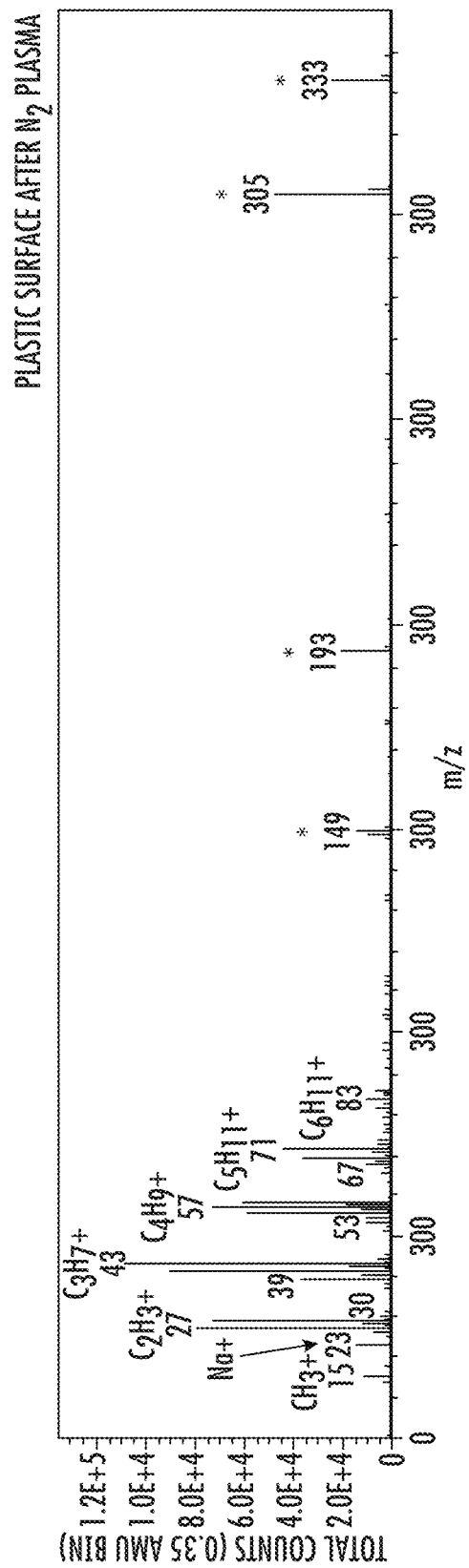
FIG. 8A
FIG. 8B

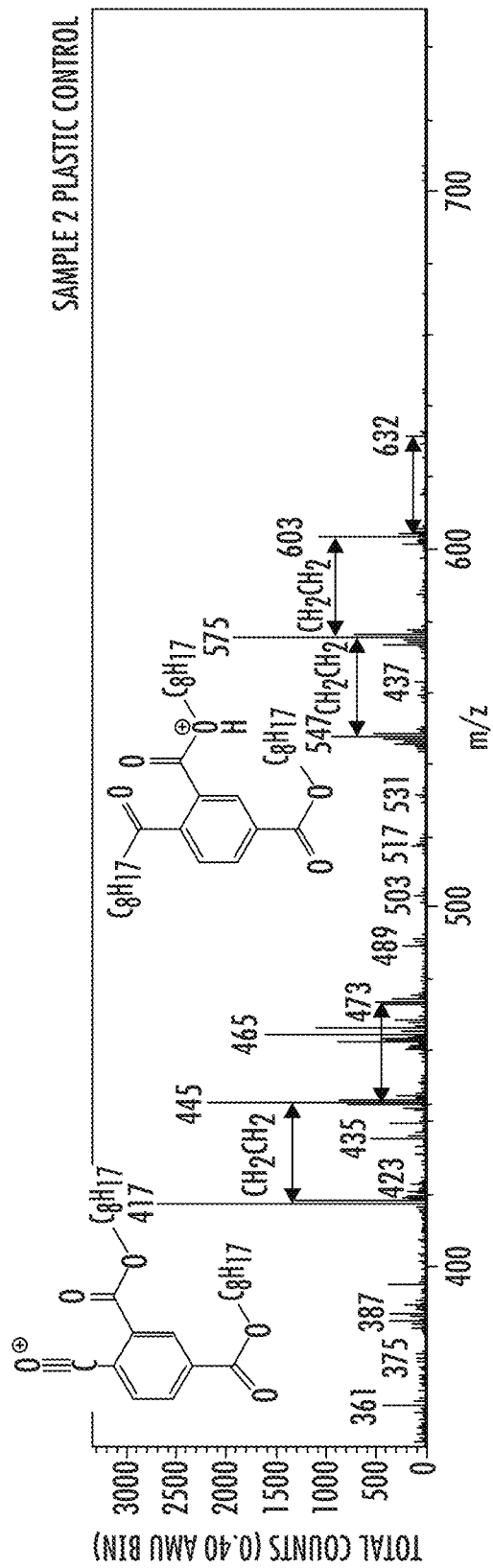
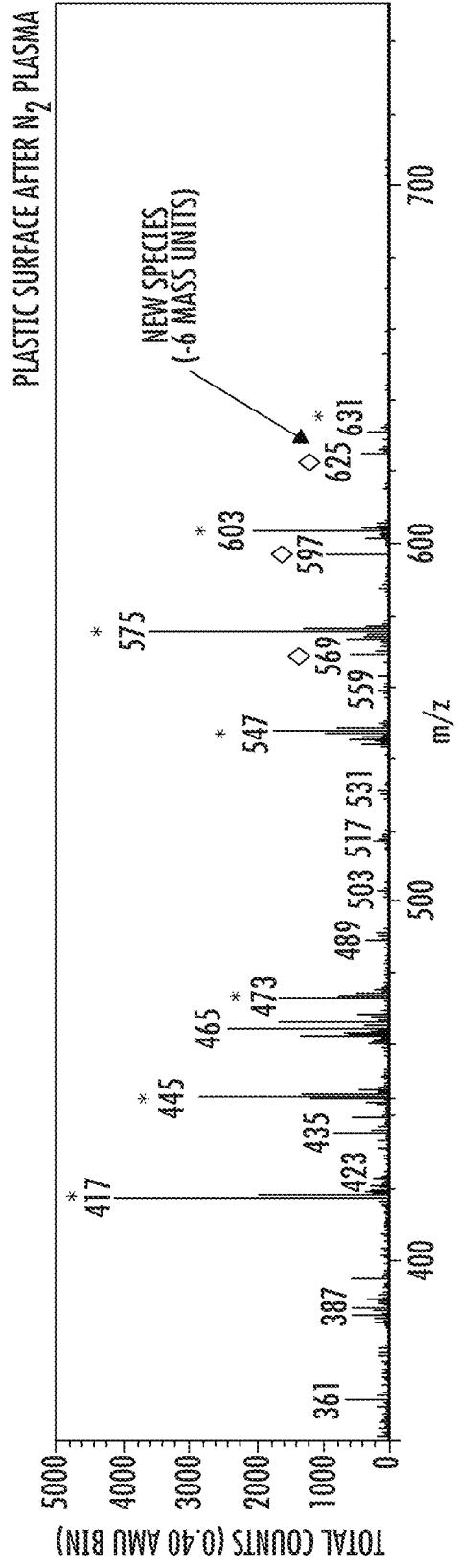
FIG. 9A
FIG. 9B

RETAINED ADHESION OF A CABLE-CONNECTOR USING A PLASMA PROCESS

PRIORITY APPLICATION

This application claims the benefit of priority of U.S. Provisional Application No. 62/912,966, filed on Oct. 9, 2019, the content of which is relied upon and incorporated herein by reference in its entirety.

FIELD OF THE DISCLOSURE

This disclosure relates generally to optical fiber cable assemblies, and more particularly, to a plasma process for optical fiber cable assemblies.

BACKGROUND OF THE DISCLOSURE

Optical fibers are commonly used for voice, video, and data transmissions in many different settings. Generally, optical fibers are encased in a cable jacket, which can be suitable for indoor and/or outdoor settings (also referred to as an "indoor/outdoor cable").

Referring to FIG. 1, a partial cutaway view of a conventional fiber optic cable 10 is shown. Fiber optic cable 10 includes a core 20 surrounded by a jacket 30 (also referred to as an "indoor/outdoor cable jacket"). As shown, core 20 includes a plurality of optical transmission elements 40 arranged about a central strength member 44. The optical transmission elements 44 are annular polymeric tubes with one or more optical fibers 48 extending along the length of cable 10. The optical fibers 48 are capable of conveying optical data. An annular armor 50 surrounds the optical transmission elements 40. The jacket 30 can abut and can be extruded over the armor so that the jacket 30 is bonded to the exterior surface of the armor 50.

As shown in FIG. 2, cable jacket 30 is surrounded by a heat shrink tube 60 along at least a portion of the length of cable jacket 30 with boot 64 and connector 66 also coupled to heat shrink tube 60. Cable jacket 30 is made of a plasticized polyvinylchloride (PVC), which provide properties such as flexibility, and durability in PVC formulations. The amount and type of plasticizer in PVC varies substantially depending on the desired application of the material. In some cases, the plasticizer content in PVC can be as high as 70 wt. % based on the total weight of the PVC. One kind of plasticizers used for PVC are phthalate molecules. Phthalate molecules in PVC are not chemically bound to PVC, but physically interact with PVC through van der Waals forces.

Heat shrink tube 60 is adhered onto cable jacket 30 by an adhesive inner layer 62 (e.g., EVA adhesive, nylon modified EVA adhesive, etc.) on heat shrink tube 60. Current indoor/outdoor cables (e.g., fiber optic cable 10) can show adhesion retention issues within its lifetime or under accelerated aging because the plasticizers of cable jacket 30 make it difficult to bond heat shrink tube 60 to cable jacket 30 via adhesive inner layer 62. That is, over time, the adhesion between adhesive inner layer 62 in heat shrink tube 60 and cable jacket 30 is lost due to interaction between plasticizers (e.g., phthalate plasticizers) of cable jacket 30 and adhesive inner layer 62.

The loss in the retained adhesion of indoor/outdoor cables is attributed to plasticizer migration during use to the surface of the jacket. As mentioned previously, phthalate molecules in PVC are not chemically bound to PVC, but physically interact with PVC through van der Waals forces. As such, phthalate molecules can diffuse to the surrounding environment. Plasticizer presence at the interface between cable jacket 30 and heat shrink tube 60 affects the adhesion between cable jacket 30 and adhesive layer 62 in heat shrink tube 60 and can lead to loss of water tight sealing. The loss in sealing can lead to failure due to optical loss (e.g., broken fibers), particularly during environmental exposure where water can ingress into the cable (e.g., freeze/thaw cycles in certain regions).

Improvements in the foregoing are desired.

SUMMARY OF THE DISCLOSURE

The present disclosure relates to a plasma treatment (under atmospheric conditions or under vacuum conditions) of a jacketed cable comprising a cable jacket and a heat shrink tubing. The plasma treatment improves retention properties of an optical fiber cable assembly by imparting a permanent change on a polymer surface of the cable jacket by cross-linking, leading to eventual graphitization, that can result in a diffusion barrier layer at an interface of the cable jacket and the heat shrink tubing, which prevents or minimizes plasticizer migration and results in an environmental seal (e.g., a long-term water tight seal).

In one embodiment, an optical fiber assembly is provided. The optical fiber assembly comprises: an optical fiber; a cable jacket surrounding the optical fiber, the cable jacket comprising a polyvinylchloride (PVC) and a plasticizer; a fiber optic connector comprising a rear housing; and a heat shrink tubing surrounding and contacting the rear housing of the fiber optic connector and an outer surface of the cable jacket to create an environmental seal at an interface between the fiber optic connector and the cable jacket; wherein the cable jacket receives a plasma treatment on a portion of the outer surface of the cable jacket, wherein the plasma treatment modifies the plasticizer and the outer surface such that migration of the plasticizer is reduced for enhancing the bonding at a second interface between the cable jacket and the heat shrink tubing.

In another embodiment, the plasma treatment modifies a portion of the outer surface of the cable jacket to a depth between 1 nanometer (nm) and 5 nm. In another embodiment, the plasma treatment modifies about 3 nm of the cable jacket. In yet another embodiment, the plasma treatment uses at least one of inert gases, air, nitrogen, or oxygen. In another embodiment, the plasma treatment uses nitrogen gas. In another embodiment, the plasma treatment modifies the portion of the outer surface by cross linking the PVC. In another embodiment, the plasma treatment increases an unsaturation of the plasticizer. In another embodiment, the optical fiber assembly further includes a heat shrink tubing at least partially surrounding the cable jacket about the portion that has been plasma treated, and wherein a bonding between the cable jacket and the heat shrink tubing can withstand an initial tensile load of up to 275 N. In another embodiment, the bonding between the cable jacket and the heat shrink tubing can withstand an aged tensile load of up to 275 N after the plasma treatment and aging at 85° C. and a relative humidity of 85 for four weeks.

In one embodiment, a method of improving adhesion of a cable is provided. The method comprises: applying a cable jacket about an optical fiber, wherein the cable jacket comprises a plasticizer and an outer surface; treating a portion of the outer surface of the cable jacket with a plasma treatment such that the plasma treatment modifies the portion of the cable jacket to reduce migration of the plasticizer for enhancing the bonding at the portion of the outer surface of the cable jacket, wherein the plasma treatment is applied absent a vacuum process at atmospheric conditions; and applying a heat shrink tubing about the portion of the outer surface of the cable jacket.

In another embodiment, the plasma treatment uses at least one inert gas and at least one of air, nitrogen, or oxygen. In another embodiment, the plasma treatment comprises a gas flow rate of between 40 standard cubic centimeters per minute (sccm) and 200 sccm of nitrogen and between 40 standard liters per minute (SLM) and 200 SLM. In another embodiment, the plasma treatment is applied at a power between 200 Watts and 1000 Watts at a time interval between 10 seconds and 20 seconds. In another embodiment, the power is between 100 W to 500 W at a time interval between 10 seconds and 20 seconds. In another embodiment, the cable jacket is made of PVC and wherein after the plasma treatment, the cable jacket undergoes cross-linking and increasing unsaturation. In another embodiment, the plasma treatment is applied by atmospheric pressure chemical vapor deposition (APCVD).

In one embodiment, a method of improving adhesion of a cable connector is provided. The method comprises: applying a cable jacket onto an optical fiber, wherein the cable jacket comprises a plasticizer and polyvinyl chloride (PVC), the cable jacket is configured to receive a heat shrink tubing; and treating the cable jacket and the plasticizer with a plasma treatment such that the plasma treatment modifies the plasticizer and the outer surface of the cable jacket to minimize plasticizer migration, wherein the plasma treatment is applied onto the cable jacket at a depth between 1 nm and 5 nm from an outer surface of the cable jacket, wherein the plasma treatment is applied absent a vacuum process at atmospheric conditions and includes a first application of at least one inert gas and a second application of at least one of air, nitrogen, or oxygen; and applying the heat shrink tubing after treating the cable jacket to create an environmental seal at an interface of the cable jacket and the heat shrink tubing.

In another embodiment, the plasma treatment modifies the cable jacket at a depth of about 3 nm from the outer surface of the cable jacket. In another embodiment, the plasma treatment comprises a gas flow rate of between 40 standard cubic centimeters per minute (sccm) and 200 sccm of nitrogen and between 40 standard liters per minute (SLM) and 200 SLM. In another embodiment, the method further comprises coupling a boot and a connector onto the cable jacket. In another embodiment, the plasma treatment modifies the plasticizer by increasing unsaturation of the plasticizer. In another embodiment, the plasticizer is selected from the group consisting of: phthalate, Dimethyl phthalate (DMP), Diethyl phthalate (DEP), Dibutyl phthalate (DBP), Butyl octyl phthalate (BOP), diisohexyl phthalate (DHP), Diisoheptyl phthalate (DIHP), Heptyl nonyl phthalate (79P), Heptyl nonyl undecyl phthalate (711P), Diisooctyl phthalate (DIOP), di-2-ethylhexyl phthalate (DOP), (n-hexyl, octyl, decyl) phthalate (610), (n-octyl, decyl) phthalate (810P), Diisodecyl phthalate (DIDP), Diundecyl phthalate (DUP), Butyl benzyl phthalate (BBP), and Alkyl benzyl phthalate. In another embodiment, the plasma treatment modifies the cable jacket by cross-linking the PVC or increasing unsaturation of the cable jacket.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 8A and 8B relate to Example 8 and are mass spectrometry plots illustrating the change in surface chemistry of a plasma modified cable jacket in accordance with the present disclosure;

FIGS. 9A-9C relate to Example 9 and are mass spectrometry plots illustrating the change in surface chemistry of a plasma modified cable jacket in accordance with the present disclosure;

DETAILED DESCRIPTION

Various embodiments will be clarified by examples in the description below. In general, the present disclosure relates to a plasma treatment (under atmospheric conditions or under vacuum conditions) of a jacketed cable comprising a cable jacket and a heat shrink tubing. The plasma treatment improves retention properties of an optical fiber cable assembly by imparting a permanent change on a polymer surface of the cable jacket by cross-linking, leading to eventual graphitization, that can result in a diffusion barrier layer at an interface of the cable jacket and the heat shrink tubing, which prevents or minimizes plasticizer migration and results in an environmental seal (e.g., a long-term water tight seal).

The optical fiber cable assembly will be described first below, followed by a discussion of the plasma treatment and corresponding method referred to above. Then, the properties of the optical fiber cable assembly will be discussed followed by working Examples.

Optical Fiber Cable Assembly

Figure 1:
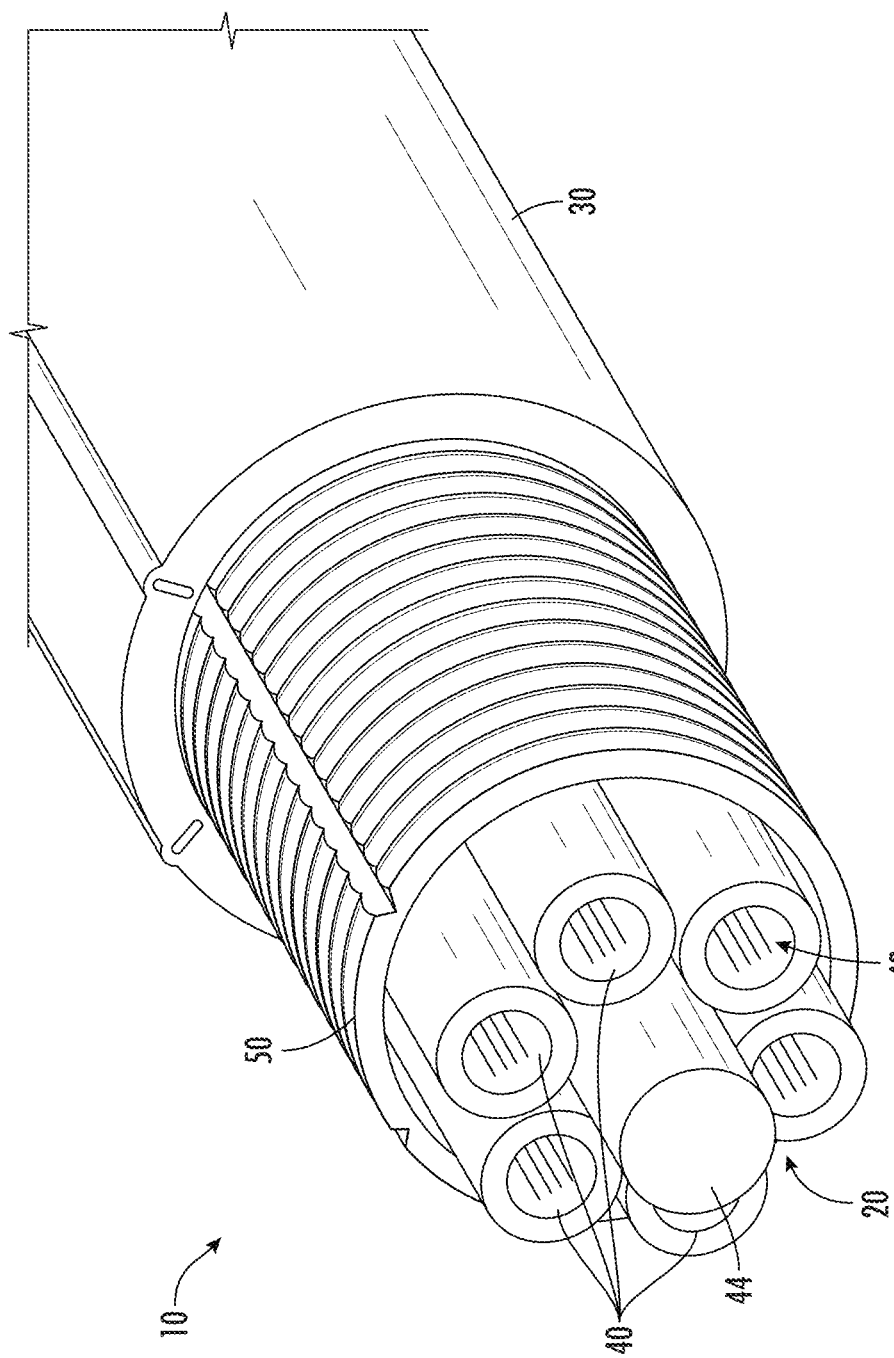
FIG. 1 is a perspective view of a conventional fiber optic cable illustrating a core and a jacket of the fiber optic cable.
Figure 2:
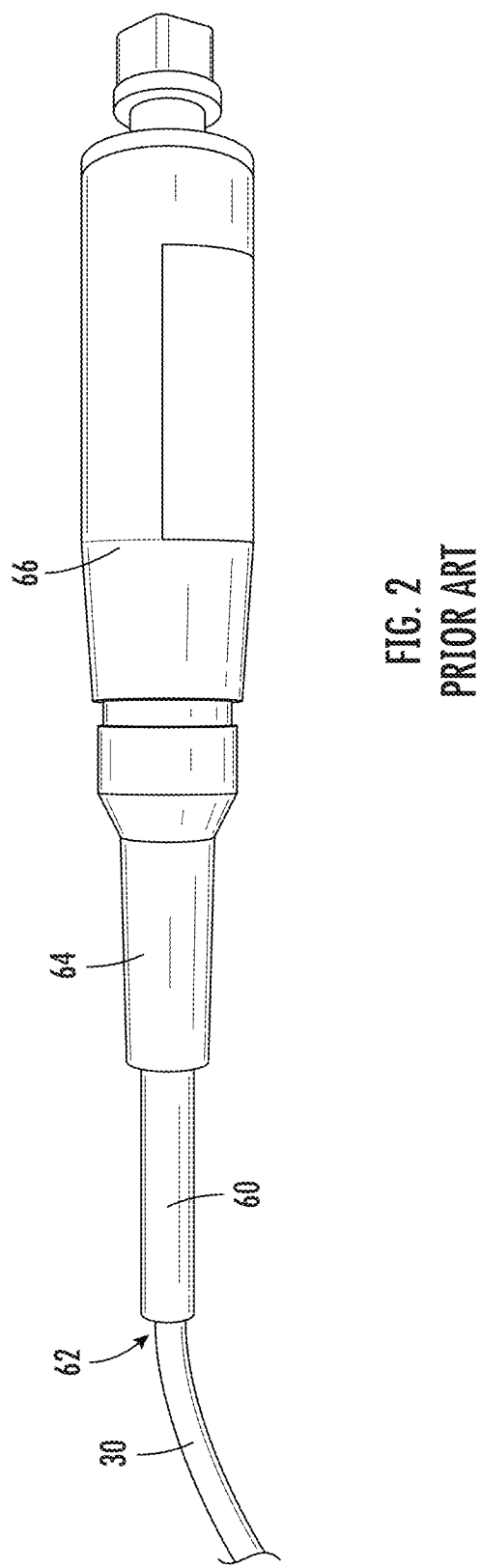
FIG. 2 is a perspective view of a conventional optical fiber assembly.
Figure 3:
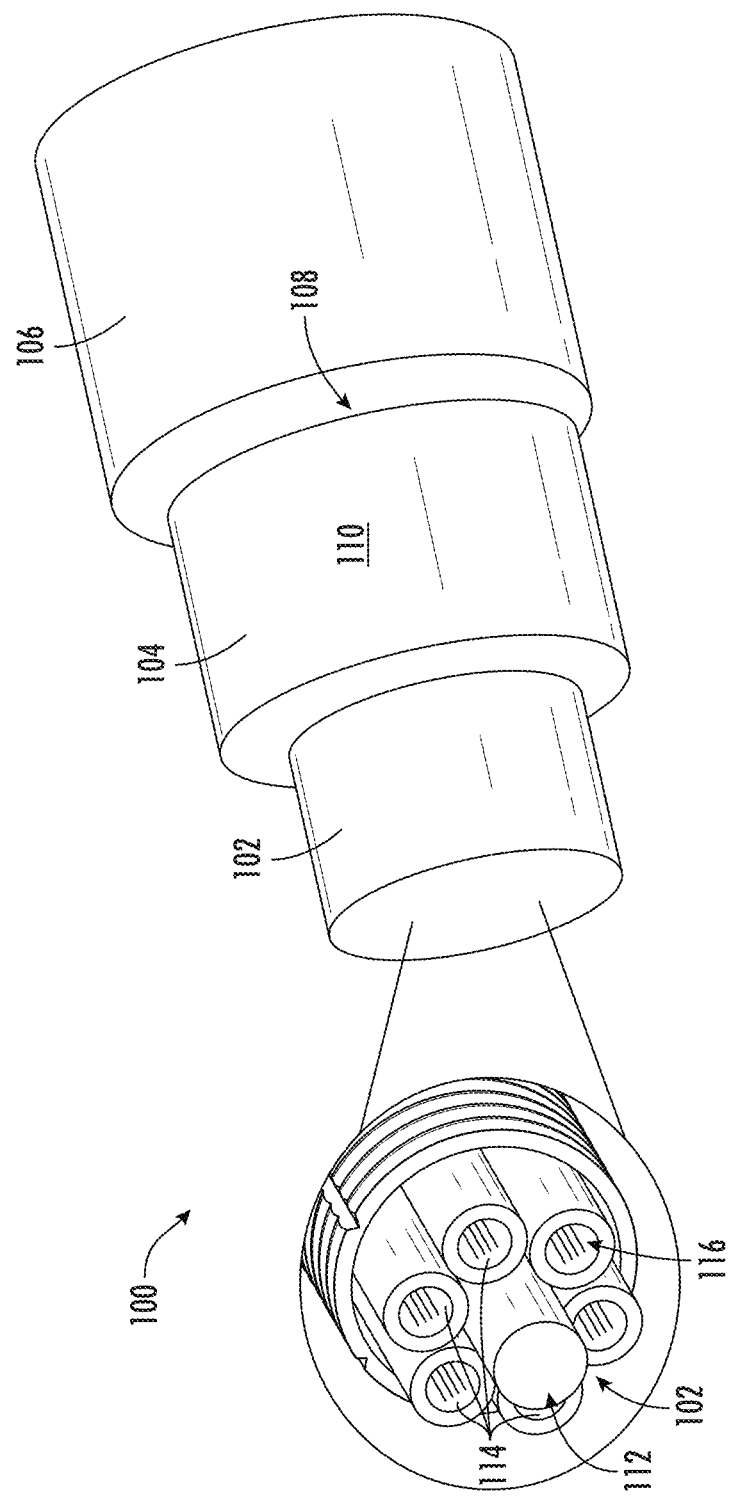
FIG. 3 is a perspective view of an optical fiber assembly in accordance with the present disclosure and showing an interface between a cable jacket and a heat shrink tubing.

Referring to FIG. 3, an optical fiber cable assembly 100 suitable for indoor/outdoor applications is shown. Optical fiber cable assembly 100 includes an optical fiber core 102, a cable jacket 104, and a heat shrink tubing 106. As generally shown in FIG. 3, an optical fiber core 102 includes a central strength member 112 and a plurality of optical transmission elements 114 arranged about central strength member 112 where the plurality of optical transmission elements 114 house optical fibers 116.

Cable jacket 104 surrounds optical fiber core 102 (with single fiber and aramid fibers inside along with other internal components (e.g., armor, etc.)) to form a jacketed cable and is made of plasticized polyvinyl chloride (PVC). However, it is within the scope of the present disclosure that in alternate embodiments, cable jacket 104 can be made of other suitable materials, such as low-density polyethylene (LDPE) or ethylene-vinyl acetate (EVA), for example. In one embodiment, cable jacket 104 has a jacket wall ranging between 1.2 millimeters (mm) and 1.4 mm, and optical fiber core 102 has an outer diameter between 4.6 mm and 5.0 mm.

As mentioned previously, cable jacket 104 is made of plasticized PVC. That is, cable jacket 104 includes a plasticizer component. The plasticizer component provides properties such as flexibility and durability in PVC formulations. In one embodiment, the plasticizer component is phthalate or a phthalate containing compound such as Dimethyl phthalate (DMP), Diethyl phthalate (DEP), Dibutyl phthalate (DBP), Butyl octyl phthalate (BOP), diisohexyl phthalate (DHP), Diisoheptyl phthalate (DIHP), Heptyl nonyl phthalate (79P), Heptyl nonyl undecyl phthalate (711P), Diisooctyl phthalate (DIOP), di-2-ethylhexyl phthalate (DOP), (n-hexyl, octyl, decyl) phthalate (610), (n-octyl, decyl) phthalate (810P), Diisodecyl phthalate (DIDP), Diundecyl phthalate (DUP), Butyl benzyl phthalate (BBP), Alkyl benzyl phthalate, etc. However, it is contemplated that in alternate embodiments, alternate plasticizer components may be used, such as mellitate or mellitate based compounds (e.g., mellitic acid based derivatives), Adipic acid, Azelaic acid, Benzoic Acid, Citric acid, Epoxy, Glycol, Hydrocarbons, Isophthalic acid, Oleic acid, Phosphoric acid, Phthalic acid, Polyesters, Ricinoleic acid, Sebacic acid, Stearic acid, Sucrose, Sulfonic acid, Terephthalic acid, Trimellitic acid, Terpenes, and soy bean oils (used in conjunction with phthalates) and castor oil (used in conjunction with phthalates), among others. In some exemplary embodiments, cable jacket 104 may comprise the plasticizer component in an amount of up to 70 wt. %, up to 65 wt. %, or up to 60 wt. % based on the total weight of cable jacket 104.

Cable jacket 104 is configured to receive a heat shrink tubing 106 along at least a portion of an outer surface 110 of cable jacket 104. As discussed in greater detail herein, a plasma treatment is applied onto outer surface 110 of cable jacket 104 to impart changes to outer surface 110 of cable jacket 104.

Heat shrink tubing 106 surrounds cable jacket 104 and functions to provide an environmental seal with cable jacket 104, thereby protecting optical fiber core 102 and optical fibers 116. Stated another way, heat shrink tubing 106 functions to create an environmental seal (e.g., a water tight seal) and to provide mechanical coupling between the connector (not shown) and cable jacket 104. As shown, heat shrink tubing 160 contacts cable jacket 104 at outer surface 110 to form an interface 108 that extends along at least a portion of the length of cable jacket 104. In one embodiment, interface 108 extends substantially along the length of cable jacket 104. The interaction between cable jacket 104 and heat shrink tubing 106 at interface 108 functions to adhere heat shrink tubing 106 to cable jacket 104 via an adhesive (not shown) and provide the environmental seal as discussed herein. As mentioned previously, plasma treatment is applied to outer surface 110 of cable jacket 104 such that the plasma treatment improves the retention properties of cable jacket 104 thereby, affecting interface 108 of cable jacket 104 and heat shrink tubing 106.

Plasma Treatment

When applied to the outer surface 110 of cable jacket 104, the plasma treatment modifies the polymer of cable jacket 104 along outer surface 110 of cable jacket 104. In some embodiments, the plasma treatment modifies between 1 nanometer (nm) and 10 nanometers (nm), between 1 nm and 7.5 nm, or between 1 nm and 5 nm of outer surface 110 of cable jacket 104. In one embodiment, the plasma treatment modifies about 3 nm of outer surface 110 of cable jacket 104. In this way, the bulk properties of the polymer (e.g., plasticized PVC) and the optical transmission of optical fibers 116 of optical fiber cable assembly 100 are unaffected. Moreover, the plasma treatment does not add an additional coating on outer surface 110 of cable jacket 104 thereby, preventing issues such as coating delamination, fracture, and pinholes.

Application of plasma treatment modifies the surface chemistry of outer surface 110 of cable jacket 104 by increasing the unsaturation of outer surface 110 of cable jacket 104 and/or enabling crosslinking of outer surface 110 of cable jacket 104. The reaction equations below show the reaction mechanisms of plasma treatment onto a cable jacket 104 made of PVC. As shown in reaction 1, the application of plasma treatment onto outer surface 110 of cable jacket 104 results in the removal of a chlorine atom and generates a free radical compound. After reaction 1, the resulting products can undergo either reaction 2 or reaction 3 thereby, yielding a combination of reaction 2 and reaction 3 products. Reaction 2 illustrates the free radical moving to an adjacent carbon to form the double bond and removing the second chlorine atom thereby, increasing the unsaturation of the compound. The products of reaction 2 can then undergo a crosslinking reaction similar to reaction 3 discussed herein. Reaction 3 illustrates the free radical moving to a carbon of another compound, as shown, to crosslink the compounds and remove a chlorine atom of the other compound.

1)
2)

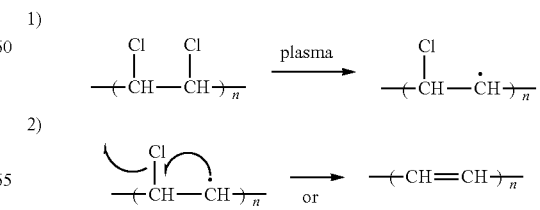

3)

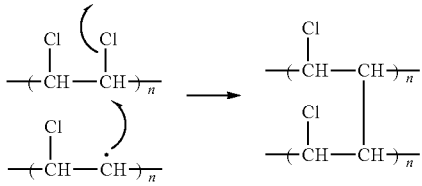

Plasma interactions with polymer surfaces can result in significant changes in the surface properties of the polymer, including changes in the wettability, electrical properties, adhesion, roughness/morphology, chemical resistance, and antimicrobial properties of the surfaces. Much of these changes are attributed to incorporation of specific moeities into the chemical structure at the surface, and these chemistries are in fact tunable depending on the composition of the plasma.

The plasma treatment described herein can be applied under vacuum conditions (referred to as "vacuum plasma treatment") or atmospheric conditions (referred to as "atmospheric plasma treatment").

The vacuum plasma treatment includes at least one of inert gases (e.g., argon, helium, etc.), air, hydrogen ($H_2$), oxygen ($O_2$), or nitrogen ($N_2$). In some embodiments, the vacuum plasma treatment is applied at a gas flow rate between 10 standard cubic centimeters (sccm) and 100 sccm, between 15 sccm and 50 sccm, or between 20 sccm and 40 sccm based on gas flow as measured by a suitable flow controller. In some embodiments, the vacuum plasma treatment is applied onto outer surface 110 at a power between 50 Watts and 600 Watts, between 75 Watts and 550 Watts, or between 100 Watts and 500 Watts. In some embodiments, the application time of the vacuum plasma treatment is 30 seconds and 10 minutes, between 30 seconds and 5 minutes, or between 10 seconds and 1 minute. In some embodiments, the vacuum plasma treatment is applied at a temperature between 10 degrees Celsius (° C.) and 65° C., between 15° C. and 60° C., or between 20° C. and 55° C. In some embodiments, the vacuum plasma treatment is applied at a pressure between 20 millitorr (mtorr) and 50 mtorr, between 25 mtorr and 45 mtorr, or between 30 mtorr and 40 mtorr.

The atmospheric plasma treatment includes at least one of inert gases (e.g., argon, helium, etc.), air, oxygen ($O_2$), or nitrogen ($N_2$). In particular, the atmospheric plasma treatment comprises a first application of an inert gas (e.g., argon, helium, etc.) and a second application of a plasma gas comprising at least one of air, oxygen ($O_2$), or nitrogen ($N_2$).

In some embodiments, the atmospheric plasma treatment is applied at a gas flow rate between 10 standard cubic centimeters per minute (sccm) and 1000 sccm, between 20 sccm and 500 sccm, or between 40 sccm and 200 sccm based on gas flow as measured by a suitable flow controller. In some embodiments, the inert gas flow rate of the atmospheric plasma treatment is between 10 standard liters per minute (SLM) and 100 SLM, between 20 SLM and 50 SLM, or between 30 SLM and 40 SLM based on gas flow as measured by a suitable flow controller. In some embodiments, the atmospheric plasma treatment is applied onto outer surface 110 at a power between 200 Watts and 1000 Watts, between 300 Watts and 900 Watts, or between 400 Watts and 800 Watts. In some embodiments, the application time of the atmospheric plasma treatment is 10 seconds and 60 seconds, between 10 seconds and 30 seconds, or between 10 seconds and 20 seconds. In one embodiment, the atmospheric plasma treatment is applied at about room temperature (about 20° C.) and atmospheric pressure (about 760 Torr). In another embodiment, the atmospheric plasma treatment is applied onto outer surface 110 of cable jacket 104 via atmospheric pressure chemical vapor deposition (APCVD).

For the purposes of the present disclosure and Examples herein, references to "plasma treatment" refer to either vacuum plasma treatment or atmospheric plasma treatment.

The plasma treatment (vacuum and atmospheric) of the present disclosure provides processing advantages. This process is compatible with flexible substrates (i.e., plasticized cable jackets) and could be used as a roll to roll process for surface treatment of cable jacket 104. Also, the plasma treatment is a relatively cheap process, throughput is fast and is easy to scale up. Moreover, the plasma treatment of the present disclosure can be a low cost method applied to any plastic material containing additives that might interfere with adhesion (both initial adhesion and adhesion over the lifetime of the assembly) since plasticizers, internal mold release agents and anti-oxidants are often added to aid in plastic production.

Method of Assembling Optical Fiber Cable Assembly

Figure 4:
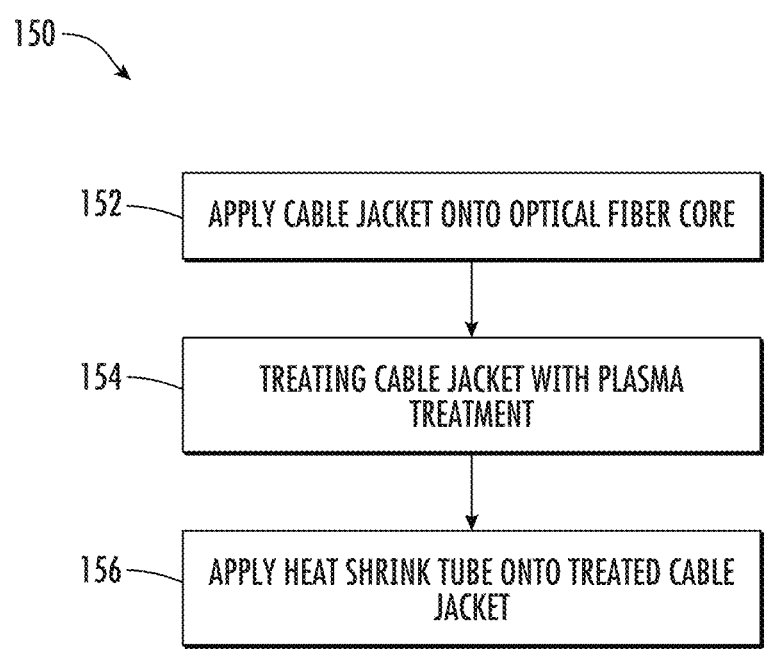
FIG. 4 is a flowchart illustrating a method for assembling the optical fiber assembly of FIG. 3 and including a plasma treatment step in accordance with the present disclosure.

Referring now to FIG. 4 and with reference to FIG. 3, a method 150 for assembling optical fiber cable assembly 100 is shown. Method 150 begins at block 152 where cable jacket 104 is applied onto optical fiber core 102. Once cable jacket 104 is applied onto optical fiber core 102, cable jacket 104 is then treated with a plasma treatment as described herein at block 154. Once cable jacket 104 is treated with the plasma treatment of the present disclosure, heat shrink tubing 106 is applied onto outer surface 110 of cable jacket 104 to create a water tight seal at interface 108 between cable jacket 104 and heat shrink tubing 106 at block 156.

Exemplary Properties of Plasma Treated Optical Fiber Cable Assembly

Plasma treated optical fiber cable assembly 100 exhibits increasing crystallinity as plasma treated optical fiber cable assembly 100 ages over the course of the lifetime of plasma treated optical fiber cable assembly 100. An increase in crystallinity indicates that rearrangement of the chemical structure of cable jacket 104 is occurring. In some embodiments, the ratio of crystalline carbon to amorphous carbon is between 0.60 and 0.75, between 0.65 and 0.75, or between 0.625 and 0.725.

In some embodiments, the plasma treated optical fiber cable assembly 100 has a pre-aged and aged tensile load to failure ranging between 40 Newtons (N) to 275 N, 50 N to 250 N, or between 100 N to 225 N. In one embodiment, the tensile load of optical fiber cable assembly 100 is between 200 N and 275 N for both pre-aged and aged optical fiber cable assemblies 100.

Plasma treated optical fiber cable assembly 100 also exhibits improved retention/adhesion between cable jacket 104 and heat shrink tubing 106. The plasma treatment of the present disclosure services multiple mechanisms on the surface of the PVC that leads to improvement in retained adhesion, including crosslinking of the cable jacket 104 (e.g., PVC) and the removal of chlorine with commensurate breakdown of the surface plasticizer. The removal of plasticizer from outer surface 110 of cable jacket 104 leads to improved adhesion of cable jacket 104 to heat shrink tubing 106, while the crosslinking of the PVC prevents the repopulation of plasticizer on outer surface 110 over time.

Stated another way, plasma treatment (both atmospheric plasma and vacuum plasma) of cable jacket 104 (e.g. PVC) can impart a permanent change on outer surface 110 of cable jacket 104 via cross-linking leading to eventual graphitization, which can result in a diffusion barrier at interface 108 thereby preventing or minimizing plasticizer migration and resulting in a long-term water tight seal.

EXAMPLES

With reference to Examples 1-3, jacketed cable samples were tested in a chamber, which was heated to 50° C. to remove moisture from the chamber. The chamber and/or the quartz boat (Example 3) were cleaned by $O_2$ plasma at 300 W for 5 minutes (Examples 1), 500 W for 5 minutes (Example 2), and 500 W for 10 minutes (Example 3) at 40 sccm. The gas flow rate (vacuum plasma treatment) was set at 40 sccm for either $O_2$ and $N_2$ (20% of the maximum gas flow rate (200 sccm)). Each jacketed cable sample (i.e., cable jacket 104 and optical fiber core 102 as discussed herein) was loaded in the chamber (one sample each time) and pressurized to the base pressure (20 millitorr (mtorr) or 9 mtorr (Example 3)). The plasma power and duration were set per each experimental condition discussed herein, and the run order was randomized while the same gas was used. In some instances, nitrogen ($N_2$) plasma ran, and oxygen ($O_2$) plasma ran subsequent.

Example 4 relates to examining vacuum plasma treatment and atmospheric plasma treatment.

Examples 5-8 relate to examining the modification of an outer surface of a cable jacket made of PVC. The modification of the cable surface was studied using both time of flight secondary ion mass spectrometry (TOF-SIMS) and attenuated total reflectance-Fourier transform infrared (ATR-FTIR, Examples 10 and 11). TOF-SIMS is a surface mass spectrometric approach that uses an ion beam to probe the top 1-3 nm of a surface. This approach enables examination for changes to the chemical structures of polymer surfaces, while simultaneously monitoring for changes in additive chemistries and/or presence of contaminants. ATR-FTIR data show crosslinking of the PVC structure or the reactivity of the plasma with the cable jacket (e.g., PVC), whether there are reaction mechanisms occurring leading to oxidative degradation of the PVC. ATR-FTIR data described about 1 micron (μm) probe depth and is able to detect both the surface and bulk effects.

Example 1

As shown in Table 1 below, jacketed cable samples 1A-1D, 2A-2E, and 3A-3E were treated with vacuum based plasma treatments of different compositions (i.e., $O_2$ and $N_2$) and at different pressure conditions. Samples 1A-1D, 2A-2E, and 3A-3E represent different types of cable jackets (i.e., Sample 1 is a black PVC, Sample 2 is a grey PVC, and Sample 3 is a blue PVC) that are tested under the different conditions shown in Table 1 below. The samples were tested in a chamber as discussed above.

TABLE 1

| Sample Number | Gas | Power (Watt) | Gas Flow (sccm) | Time (sec) | Pressure (mtorr) | Temp (deg. C.) | Run Order | complete |
|---|---|---|---|---|---|---|---|---|
| Sample 1A | N2 | 100 | 40 | 30 | 37 | 50 | 5 | x |
| Sample 2A | N2 | 100 | 40 | 30 | 37 | 50 | 3 | x |
| Sample 2B | N2 | 100 | 40 | 30 | 37 | 50 | 3 | x |
| Sample 3A | N2 | 100 | 40 | 30 | 35 | 50 | 1 | x |
| Sample 3B | N2 | 100 | 40 | 30 | 35 | 50 | 1 | x |
| Sample 1B | O2 | 100 | 40 | 30 | 35 | 50 | 6 | x |
| Sample 2C | O2 | 100 | 40 | 30 | 35 | 50 | 4 | x |
| Sample 2D | O2 | 100 | 40 | 30 | 35 | 50 | 4 | x |
| Sample 3C | O2 | 100 | 40 | 30 | 33 | 50 | 2 | x |
| Sample 3D | O2 | 100 | 40 | 30 | 33 | 50 | 2 | x |
| Sample 1C | N2 | 100 | 40 | 60 | 37 | 50 | 8 | x |
| Sample 1D | O2 | 100 | 40 | 60 | 35 | 50 | 7 | x |
| Sample 2E | O2 | 100 | 40 | 60 | 35 | 50 | 10 | x |
| Sample 3E | O2 | 100 | 40 | 60 | 35 | 50 | 9 | x |

Table 1 above indicates that plasma treatment of Samples 1A-1D, 2A-2E, and 3A-3E underwent successful vacuum plasma treatments under the conditions listed in Table 1.

Example 2

As shown in Table 2 below, Samples 1-4 of jacketed cables were treated with vacuum plasma treatments of different compositions (i.e., $O_2$ and $N_2$), different power conditions (300 W and 500 W), and different pressure conditions. Samples 1-4 were the same type of cables (i.e., a blue PVC). The samples were individually tested in a chamber as discussed above.

TABLE 2

| Sample ID | Gas | Power (Watt) | Gas Flow (sccm) | Time (sec) | Pressure (mtorr) | Temp (deg. C.) | run order | complete |
|---|---|---|---|---|---|---|---|---|
| Sample 1 | O2 | 300 | 40 | 30 | 38 | 51 | 1 | x |
| Sample 2 | N2 | 300 | 40 | 30 | 35 | 51 | 2 | x |
| Sample 3 | O2 | 500 | 40 | 30 | 36 | 51 | 3 | x |
| Sample 4 | N2 | 500 | 40 | 30 | 35 | 51 | 4 | x |

Table 1 above indicates that plasma treatment of Samples 1-4 underwent successful vacuum plasma treatments under the conditions listed in Table 2.

Example 3

As shown in Table 3 below, jacketed cable samples 1A-1D and 2 were treated with vacuum plasma treatments of different compositions (i.e., $O_2$ and $N_2$) and at different power, time, pressure, and temperature conditions. Samples 1A-1D and 2 comprised of 16 pieces of 6 inch long black cables received in a quartz boat. The chamber and the quartz boat were cleaned as discussed above.

The samples were handled with a stainless-steel tweezer and were not pre-cleaned. The samples were tested in a chamber (base pressure of 9 mtorr) as discussed above.

TABLE 3

| Sample ID | Gas | Power (Watt) | Gas Flow (sccm) | Time (sec) | Pressure (mtorr) | Temp (deg. C.) | Order |
|---|---|---|---|---|---|---|---|
| Sample 1A | O2 | 500 | 40 | 300 | 34 | 50 | 1 |
| Sample 2 | O2 | 500 | 40 | 30 | 35 | 49 | 5 |
| Sample 1B | N2 | 500 | 40 | 30 | 34 | 48 | 2 |
| Sample 1C | O2 | 100 | 40 | 30 | 34 | 50 | 3 |
| Sample 1D | N2 | 100 | 40 | 30 | 35 | 48 | 4 |

Table 3 above indicates that plasma treatment of Samples 1A-1D and 2 underwent successful vacuum plasma treatments under the conditions listed in Table 3.

Example 4

Similar to Examples 1-3, jacketed cable samples 1-8 were tested in a chamber, which was heated to 50° C. to remove moisture from the chamber. The chamber was cleaned by O$_2$ plasma at 300 W for 5 minutes at 40 sccm. Samples 1-8 are black jacketed cables made of PVC.

As shown in Table 3 below, the testing conditions for the plasma treatment varied among samples. Samples 1-5 were tested under atmospheric conditions with N$_2$ plasma and inert gas (e.g., Argon) flow rates of 200 sccm and 40 standard liters per minute (SLM). Sample 1 had a plasma treatment at a power of 800 Watts while Samples 2-5 had plasma treatments at powers of 425 Watts. Samples 1-3 had plasma treatments applied at scanning speeds of 5 millimeters per second (mm/s) for 2 scans along the cable jacket while samples 4 and 5 had plasma treatments applied at scanning speeds of 10 mm/s for 2 scans along the cable jacket.

Samples 6-8 were tested under vacuum conditions with N$_2$ plasma having a power of 100 Watts and a gas flow rate of 40 sccm as shown in Table 4. The plasma treatment was operated at a pressure of 34 mtorr and a temperature of 50° C.

Similar to Examples 1-3, each jacketed cable sample (i.e., cable jacket 104 and optical fiber core 102 as discussed herein) was loaded in the chamber, and pressurized to the base pressure, if applicable (i.e., Samples 6-8).

Table 4 above indicates that plasma treatment of Samples 1-5 and 6-8 underwent successful atmospheric plasma treatments and vacuum plasma treatments respectively under the conditions listed in Table 4.

Example 5

Figure 5A:
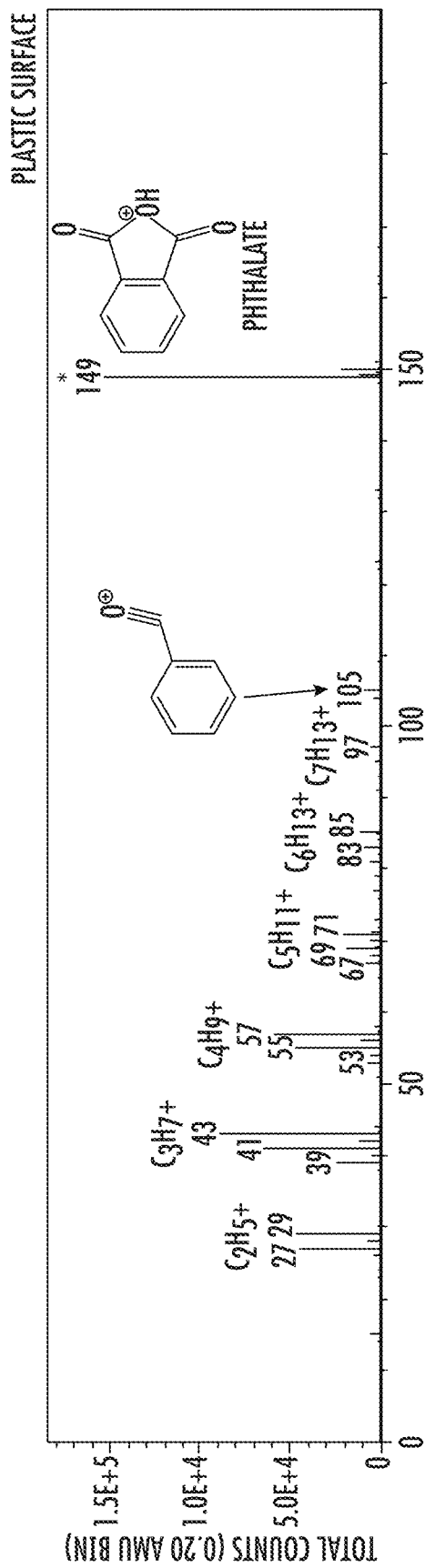
FIGS. 5A and 5B relate to Example 5 and are mass spectrometry plots illustrating the change in surface chemistry of a plasma modified cable jacket at low mass ranges in accordance with the present disclosure.
Figure 5B:
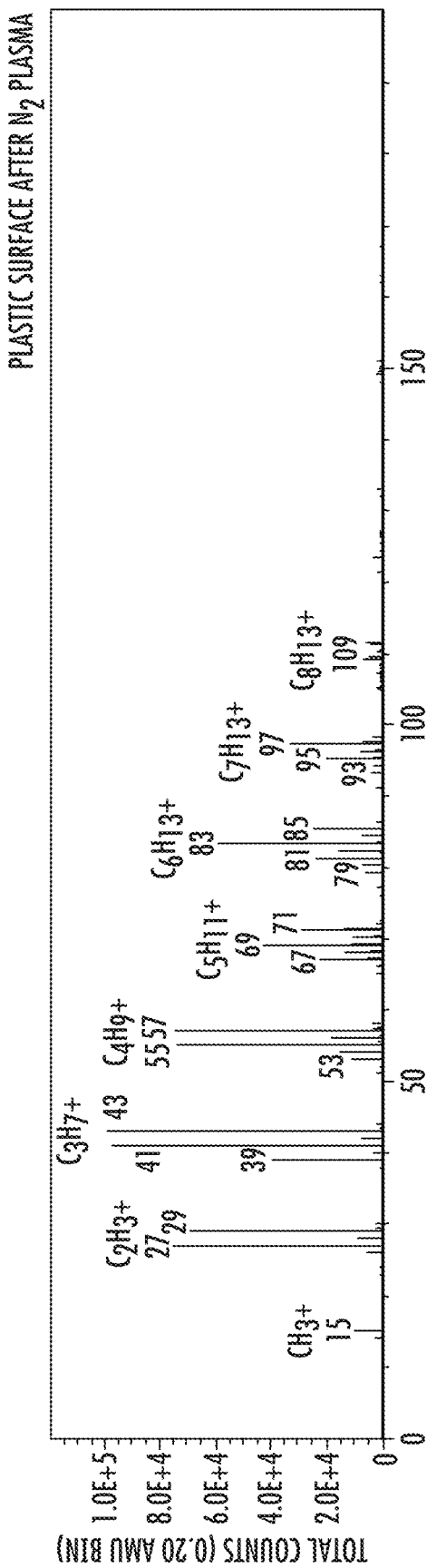

Referring now to FIGS. 5A and 5B, positive ion mass spectra (low mass ranges) is shown for a black jacketed cable sample. As shown, the jacketed cable sample is made of PVC and includes phthalate molecules as the plasticizer component of the cable jacket. FIG. 5A shows the mass spectra of the jacketed cable sample prior to plasma treatment, and FIG. 5B shows the mass spectra of the jacketed cable sample after application of plasma treatment. The plasma treatment includes nitrogen (N$_2$) applied at a power of 100 W for 30 seconds.

As shown in FIG. 5B, application of the plasma treatment results in the removal of the peaks associated with the presence of phthalate molecules in the cable jacket of the jacketed cable sample. In particular, the peaks at 149 m/z and 105 m/z of FIG. 5A (both of which are associated with phthalate) are removed in FIG. 5B (after the plasma treatment). Also observed in FIG. 5B, are a series of $C_xH_y^+$ hydrocarbon peaks, which are associated with the PVC structure, and no obvious chlorine (~35 m/z) containing peaks can be seen.

Example 6

Figure 6A:
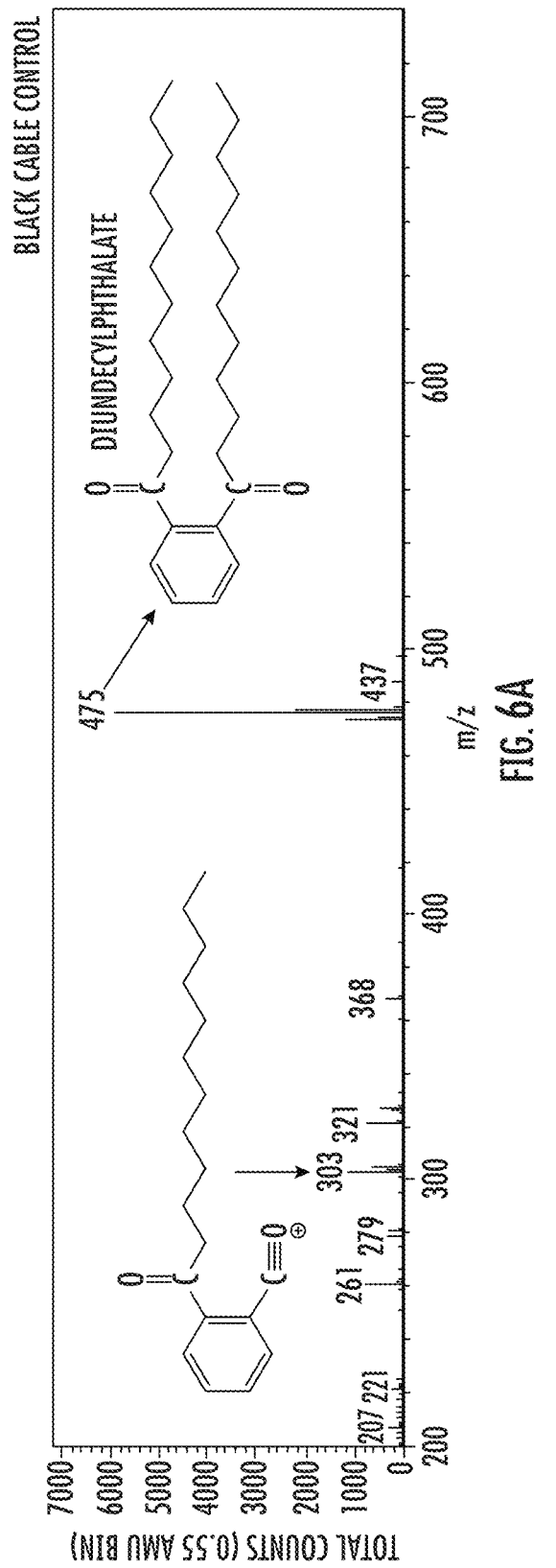
FIGS. 6A and 6B relate to Example 6 and are mass spectrometry plots illustrating the change in surface chemistry of a plasma modified cable jacket at high mass ranges in accordance with the present disclosure.
Figure 6B:
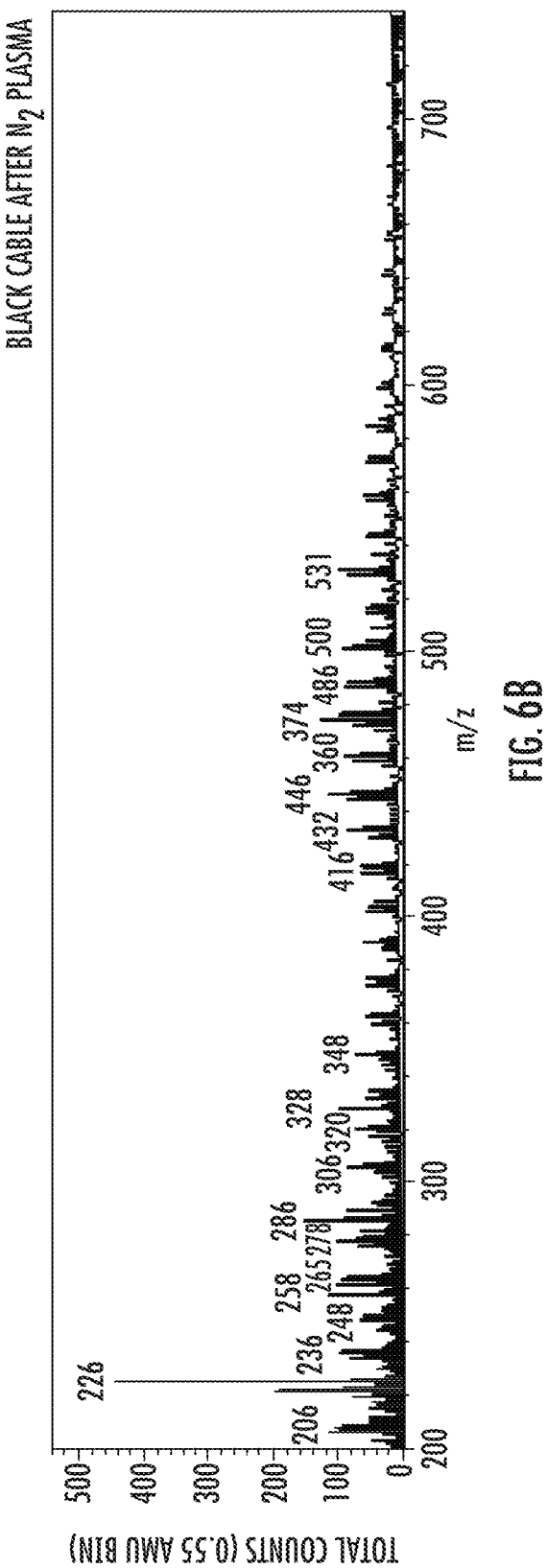

Referring now to FIGS. 6A and 6B, positive ion mass spectra (high mass ranges) is shown for a jacketed cable sample. As shown, the jacketed cable sample is made of PVC and includes diundecylphthalate molecules as the plasticizer component of the cable jacket. FIG. 6A shows the mass spectra of the jacketed cable sample prior to plasma treatment, and FIG. 6B shows the mass spectra of the jacketed cable sample after application of the plasma treatment. The plasma treatment includes nitrogen (N$_2$) applied at a power of 100 W for 30 seconds.

As shown in FIG. 6B, application of the plasma treatment results in the removal of the peaks associated with the presence of diundecylphthalate molecules in the cable jacket of the jacketed cable sample. In particular, the peaks at 475 m/z and 303 m/z of FIG. 6A (which are associated with diundecylphthalate) are removed in FIG. 6B after the plasma treatment.

Example 7

Figure 7A:
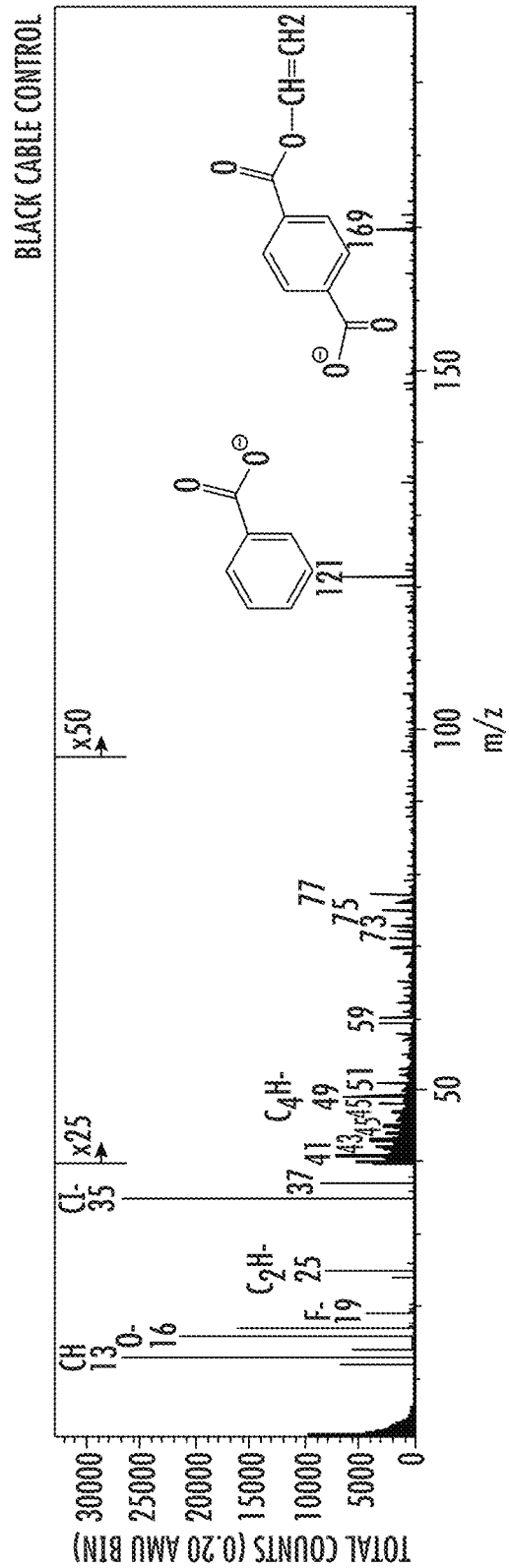
FIGS. 7A and 7B relate to Example 7 and are negative ion mass spectrometry plots illustrating the change in surface chemistry of a plasma modified cable jacket in accordance with the present disclosure.
Figure 7B:
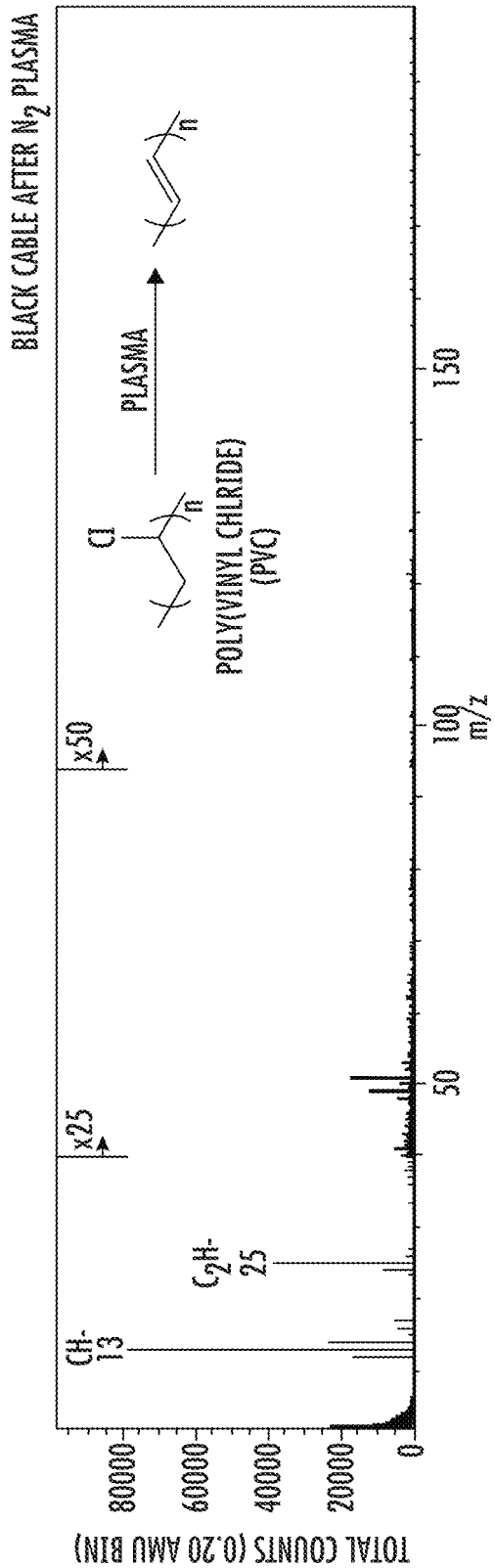

Referring now to FIGS. 7A and 7B, negative ion mass spectra (low mass ranges) is shown for a jacketed cable sample. As shown, the jacketed cable sample is made of

TABLE 4

| Sample ID | Testing Conditions | Gas | Power (Watt) | Gas Flow (sccm) | Ar gas (SLM) | Scan speed (mm/s) | # scan |
|---|---|---|---|---|---|---|---|
| Sample 1 | Atmospheric | N2 | 800 | 200 | 40 | 5 | 2 |
| Sample 2 | Atmospheric | N2 | 425 | 200 | 40 | 5 | 2 |
| Sample 3 | Atmospheric | N2 | 425 | 200 | 40 | 5 | 2 |
| Sample 4 | Atmospheric | N2 | 425 | 200 | 40 | 10 | 2 |
| Sample 5 | Atmospheric | N2 | 425 | 200 | 40 | 10 | 2 |
| Sample 6 | Vacuum | N2 | 100 | 40 | 0 | N/A | N/A |
| Sample 7 | Vacuum | N2 | 100 | 40 | 0 | N/A | N/A |
| Sample 8 | Vacuum | N2 | 100 | 40 | 0 | N/A | N/A |

PVC and includes phthalate molecules as the plasticizer component of the cable jacket. FIG. 7A shows the mass spectra of the jacketed cable sample prior to plasma treatment, and FIG. 7B shows the mass spectra of the jacketed cable sample after application of the plasma treatment. The plasma treatment includes nitrogen ($N_2$) applied at a power of 100 W for 30 seconds.

As shown in FIG. 7B, application of the plasma treatment results in the removal of the peaks associated with the presence of phthalate molecules in the cable jacket of the jacketed cable sample. In particular, the peaks at 121 m/z and 169 m/z of FIG. 7A (which are associated with phthalate) are removed in FIG. 7B (after the plasma treatment). In addition, application of the plasma treatment results in the removal of the peak associated with the presence of chlorine in the cable jacket of the jacketed cable sample. That is, the peak at 35 m/z of FIG. 7A (which is associated with chlorine) is removed in FIG. 7B (after the plasma treatment). The removal of chlorine indicates that crosslinking is occurring within the PVC (which would result in the loss of chlorine as double bonds form).

Example 8

Referring now to FIGS. 8A and 8B, positive ion mass spectra is shown for a jacketed cable sample. As shown, the jacketed cable sample is made of PVC and includes phthalate and mellitate molecules as the plasticizer component of the cable jacket. FIG. 8A shows the mass spectra of the jacketed cable sample prior to plasma treatment, and FIG. 8B shows the mass spectra of the jacketed cable sample after application of the plasma treatment. The plasma treatment includes nitrogen ($N_2$) applied at a power of 100 W for 30 seconds.

As shown in FIG. 8B, application of the plasma treatment does not result in the same reduction (as Example 5) in phthalate plasticizers after plasma treatment. Without wishing to be held to any particular theory, it is believed that this is because the plasticizer on the surface includes a mellitate type plasticizer, which is known to have a decreased volatility.

Example 9

Oxygen ($O_2$) plasma treatment was also used to treat a tight buffered fiber having a plasticized PVC used for the tight buffer. The plasticized PVC (e.g., Teknor Apex, 910A-18) was different from the PVC used for the indoor/outdoor rugged drop cable (e.g., Black cable, Westlake 16882) and showed different types of plasticizers and other additives during analysis. Oxygen ($O_2$) plasma treatment was applied at a power of 100 W for 30 seconds.

Figure 9C:
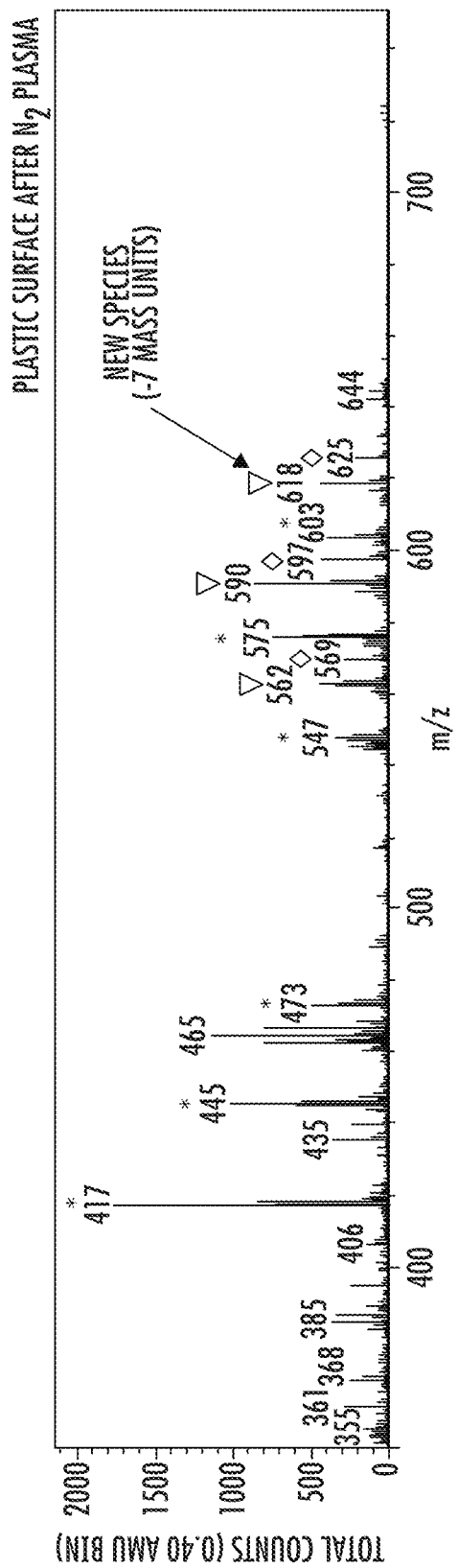

With reference to FIGS. 9A-9C, positive ion mass spectras are shown for the jacketed cable sample. The jacketed cable sample is made of PVC and includes phthalate and mellitate molecules as the plasticizer components of the cable jacket. FIG. 9A shows the mass spectra of the jacketed cable sample prior to plasma treatment, and FIG. 9B shows the mass spectra of the jacketed cable sample after application of the oxygen plasma treatment discussed above. FIG. 9C shows the mass spectra of the jacketed cable sample after application of the plasma treatment. Similar to the oxygen plasma treatment, the nitrogen plasma treatment includes nitrogen ($N_2$) applied at a power of 100 W for 30 seconds.

As shown in FIGS. 9B and 9C in comparison with FIG. 9A, there were changes in the chemical structures of the sample cable jackets as a result of the plasma treatment with greater chemical modification with $N_2$ plasma as compared to $O_2$ plasma. In particular, after the oxygen ($O_2$) plasma treatment, the amount of chlorine in the mass spectra was also significantly reduced, but to a lower extent as compared to nitrogen ($N_2$) plasma treatment, suggesting that crosslinking of the PVC is reduced with oxygen ($O_2$) plasmas. Without wishing to be held to any particular theory, it is believed that the structural changes are likely associated with double bond formation (increasing degree of unsaturation) of the parent molecule (mellitate). In addition, without wishing to be held to a particular theory, it is also believed that the lessened reduction is likely associated with either the free radical trapping mechanisms, which prevent the crosslinking of the PVC structure or the reactivity of the plasma, pushing the mechanisms towards oxidative degradation of the PVC.

Example 10

Figure 10:
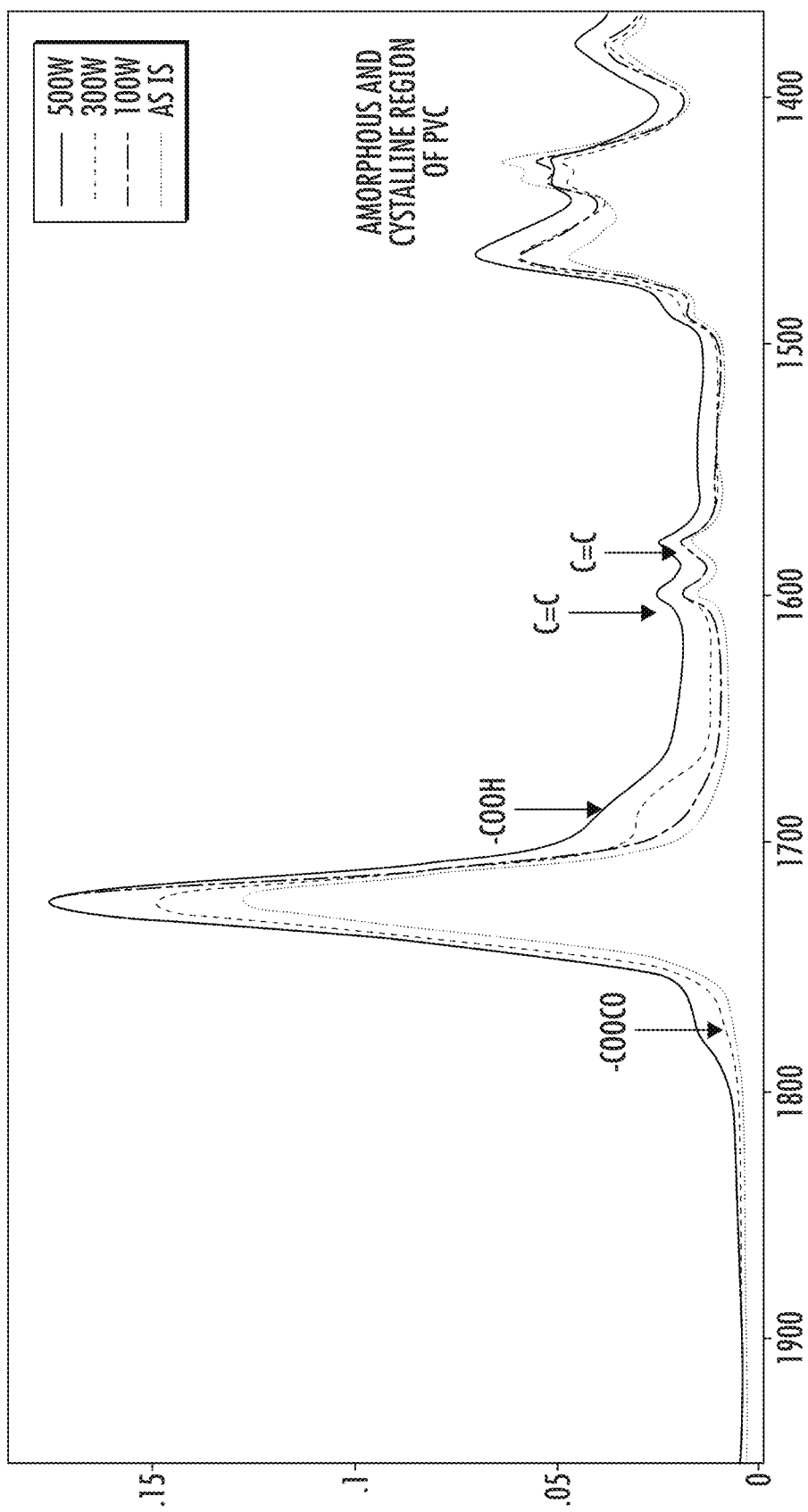
FIG. 10 relates to Example 10 and are attenuated total reflectance-Fourier transform infrared (ATR-FTIR) spectra data illustrating the change in surface chemistry of a plasma modified cable jacket.

Referring now to FIG. 10, an attenuated total reflectance-Fourier transform infrared (ATR-FTIR) spectra is shown for a jacketed cable sample after plasma treatment. The jacketed cable sample is made of PVC and includes phthalate molecules as the plasticizer component of the cable jacket. The jacketed cable sample underwent oxygen ($O_2$) plasma treatment at various powers ranging from 0 W to 500 W (as indicated by the different lines in FIG. 10) for 30 seconds.

As shown in FIG. 10, at different plasma treatment powers, there is an increase in —COOH and —COOCO chemistry indicating the breakdown of phthalate functionality. There is also an increase in the crystalline carbon to amorphous carbon ratio thereby, indicating removal of chlorine and indicating polyethylene crosslinking. Stated another way, FIG. 10 shows a breakdown of phthalate from plasma treatments indicated by the broadening of the C═O absorption at 1724 $cm^{-1}$ which also signifies the formation of carboxylic acid groups. FIG. 10 also indicates an increase in polymer crystallinity based on a comparison of the absorption of crystalline versus amorphous methylene peaks at 1427 $cm^{-1}$ and 1435 $cm^{-1}$, respectively as discussed in greater detail in Example 12.

Example 11

Figure 11:
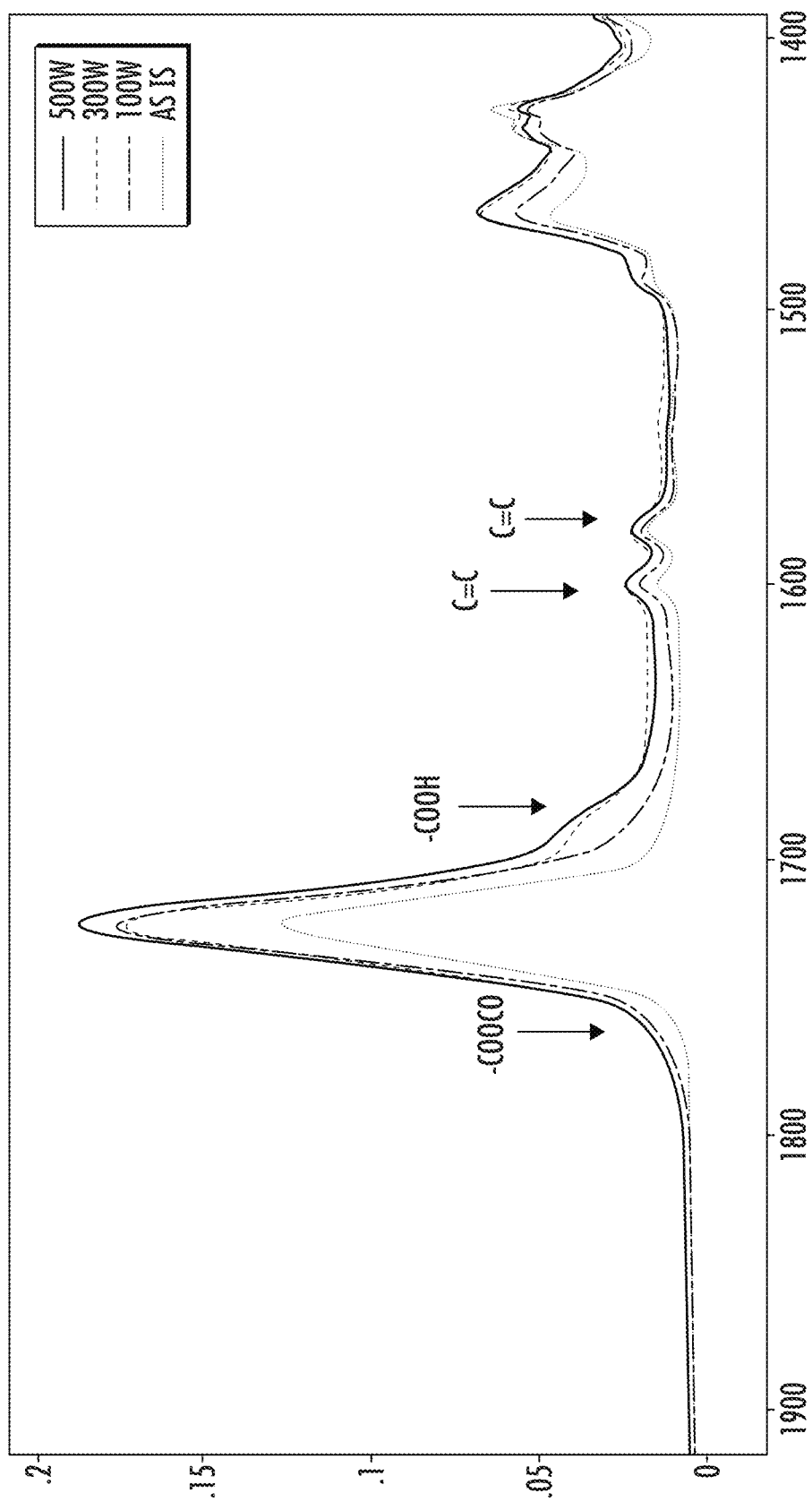
FIG. 11 relates to Example 11 and are ATR-FTIR spectra data illustrating the change in surface chemistry of a plasma modified cable jacket.

Referring now to FIG. 11, an ATR-FTIR spectra is shown for a jacketed cable sample after plasma treatment. The jacketed cable sample is made of PVC and includes phthalate molecules as the plasticizer component of the cable jacket. The jacketed cable sample underwent nitrogen ($N_2$) plasma treatment at various powers ranging from 0 W to 500 W (as indicated by the different lines in FIG. 10) for 30 seconds.

As shown in FIG. 11, similar to Example 9, at different plasma treatment powers, there is an increase in —COOH indicating the breakdown of phthalate functionality. There is also an increase in crystalline/amorphous ratio indicating removal of chlorine and indicating polyethylene crosslinking. That is, similar to Example 11 and FIG. 10, FIG. 11 shows a breakdown of phthalate from plasma treatments indicated by the broadening of the C═O absorption at 1724 $cm^{-1}$ which also signifies the formation of carboxylic acid groups. FIG. 11 also indicates an increase in polymer crystallinity based on a comparison of the absorption of crystalline versus amorphous methylene peaks at 1427 $cm^{-1}$ and 1435 $cm^{-1}$, respectively as discussed in greater detail in Example 12.

Example 12

Figure 12:
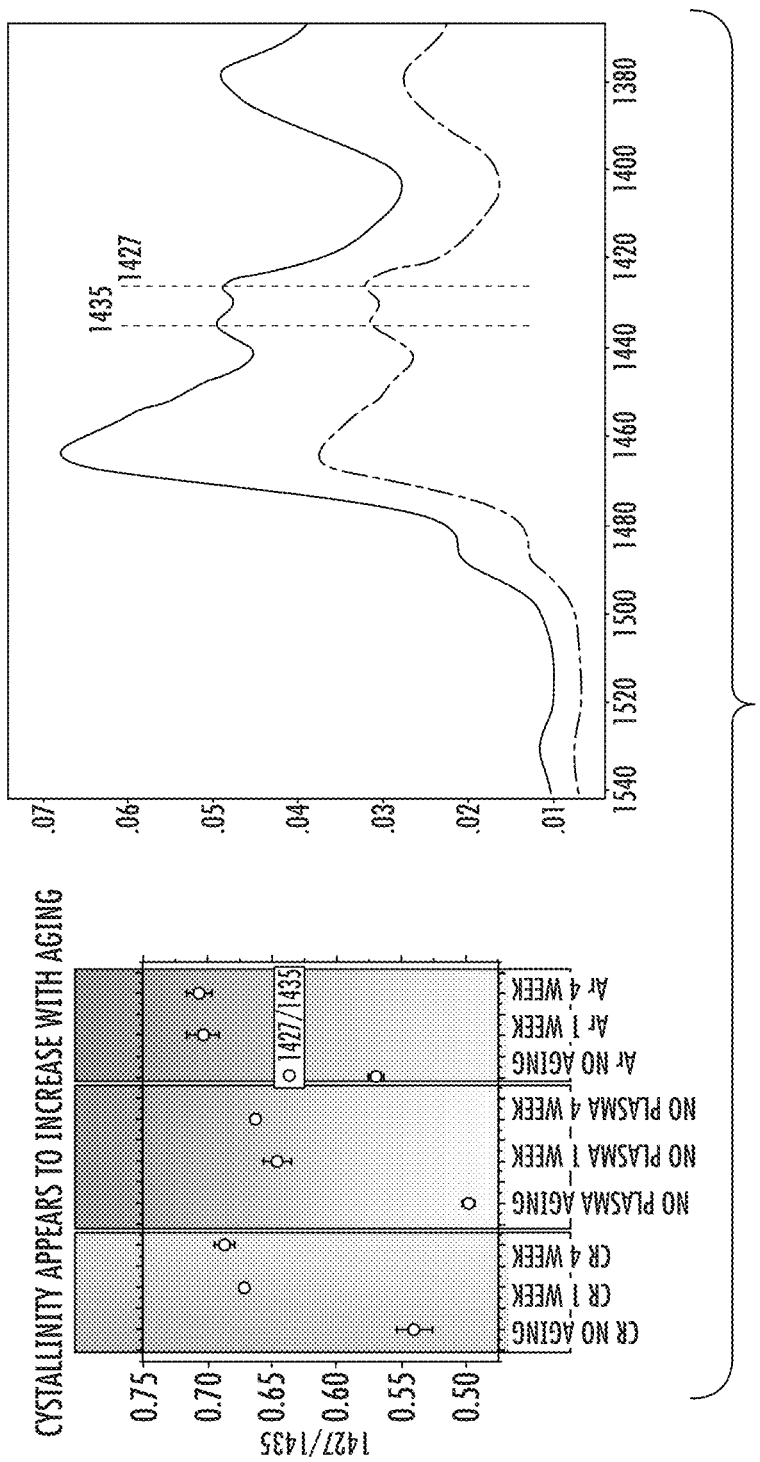
FIG. 12 relates to Example 12 and illustrates the change in crystallinity of a plasma modified cable jacket after aging.

Referring now to FIG. 12, an ATR-FTIR spectra is shown for a jacketed cable sample after oxygen ($O_2$) plasma treatment and another jacketed cable sample after argon (Ar) plasma treatment. The jacketed cable samples were a black indoor/outdoor cable made of PVC and includes phthalate molecules as the plasticizer component of the cable jacket. The jacketed cable samples underwent oxygen ($O_2$) and argon (Ar) plasma treatment, respectively, at powers of 500 W for 30 seconds and 300 Watts for 30 seconds, respectively. The jacketed cable samples were compared with non-plasma treated cable samples. All cable samples were measured at the following times: aged 0 weeks, aged 1 week at an 85% relative humidity (RH), 85° C. environment, and aged 4 weeks at an 85% RH, 85° C. environment.

As shown in FIG. 12, there is an increase in the crystalline carbon to amorphous carbon ratio for all samples. In particular, the intensity of the peaks increases after aging and the plots indicate the crystalline carbon to amorphous carbon ratio show increases. As mentioned previously, increasing crystallinity indicates that rearrangement of the chemical structure of the PVC of the cable jacket is occurring.

Without wishing to be held to any particular theory, since all samples show change in crystallinity with aging, it is believed that the plasma treated cable samples' crosslinked (in addition to phthalate breakdown) top surface acts as a barrier coating that prevents migration of further phthalate to the interface thereby, affecting the improvement with retained tensile strength (as discussed in Example 13 below). By contrast, in the non-treated case, since phthalate migration is not limited, induced crystallinity increase does not improve retained adhesion after aging.

Example 13

Figure 13:
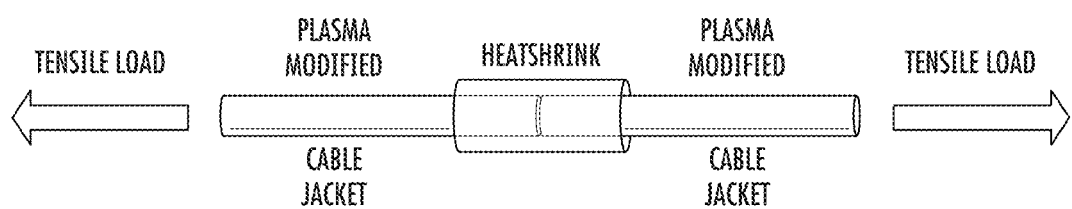
FIG. 13 relates to Example 13 and illustrates the method for measuring tensile load for the plasma modified cable jacket.

Referring now to FIG. 13, an optical fiber cable assembly 100 is shown undergoing a tensile load test. The optical fiber cable assembly 100 includes a plasma modified (i.e., plasma treated) cable jacket made of PVC and having a heat shrink tubing adhered to the plasma treated cable jacket. As shown in Table 5 below, Samples 1-10 varied in plasma treatment between oxygen ($O_2$) and nitrogen ($N_2$), between a power of 100 W and 500 W, and between a time interval of 30 seconds and 5 minutes. Also, Samples 1-10 varied in their testing environment, specifically whether the samples underwent aging. In particular, Samples 1-5 did not undergo aging (i.e., Samples 1-5 were tested after plasma treatment application (denoted as "Initial Conditions" under "Environment" and "Test Interval" columns)), while Samples 6-10 underwent accelerated aging (4 weeks at 85° C. and 85 relative humidity (RH) (denoted as "85HH" in Table 5 below)).

As mentioned previously, Samples 1-10 underwent tensile load testing. As shown in FIG. 13, tensile load was applied laterally on the plasma treated cable jacket to measure the overall tensile load at yield or failure where failure was defined as delamination of heat shrink tubing from the cable jacket (an adhesive failure) or fracturing the heat shrink tubing (cohesive failure). Table 5 shows the results of the tensile load testing.

TABLE 5

| Sample | Initial Speed (mm/min) | Peak Force (N) | Load At Yield (N) | Extension At Yield (N) | Environment | Test Interval | Plasma Conditions |
|---|---|---|---|---|---|---|---|
| Sample 1 | 50.0 | 130.986 | 130.986 | 94.609 | Initial Conditions | Initial Conditions | O2/100 W/30 seconds |
| Sample 2 | 50.0 | 123.243 | 123.243 | 76.869 | Initial Conditions | Initial Conditions | N2/100 W/30 seconds |
| Sample 3 | 50.0 | 184.773 | 45.119 | 2.577 | Initial Conditions | Initial Conditions | O2/500 W/30 seconds |
| Sample 4 | 50.0 | 193.145 | 193.145 | 179.756 | Initial Conditions | Initial Conditions | O2/500 W/5 minutes |
| Sample 5 | 50.0 | 158.335 | 158.335 | 129.035 | Initial Conditions | Initial Conditions | N2/500 W/30 seconds |
| Sample 6 | 50.0 | 210.615 | 210.615 | 143.431 | 85HH | 4 weeks | O2/100 W/30 seconds |
| Sample 7 | 50.0 | 215.180 | 211.881 | 151.875 | 85HH | 4 weeks | N2/100 W/30 seconds |
| Sample 8 | 50.0 | 203.437 | 203.437 | 144.311 | 85HH | 4 weeks | O2/500 W/30 seconds |
| Sample 9 | 50.0 | 207.306 | 50.773 | 6.134 | 85HH | 4 weeks | O2/500 W/5 minutes |
| Sample 10 | 50.0 | 201.266 | 201.266 | 149.349 | 85HH | 4 weeks | N2/500 W/30 seconds |

Initial tensile load measurement data following plasma treatment of the PVC surface shows that overall tensile load is similar to non-treated cable samples before aging. However, as shown in Table 5 above, an increase in tensile load was seen on plasma treated cable parts that were bonded to a heat shrink tubing following 4 weeks of accelerated aging at 85° C. and 85% relative humidity. By contrast, nontreated cable parts that were subjected to aging typically showed a significant drop in the tensile load from the initial value.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. An optical fiber assembly comprising:
   an optical fiber;
   a cable jacket surrounding the optical fiber, the cable jacket comprising a polyvinylchloride (PVC) and a plasticizer;
   a fiber optic connector comprising a rear housing; and
   a heat shrink tubing surrounding and contacting the rear housing of the fiber optic connector and an outer surface of the cable jacket to create an environmental seal at an interface between the fiber optic connector and the cable jacket;

wherein the cable jacket receives a plasma treatment on a portion of the outer surface of the cable jacket, wherein the plasma treatment modifies the plasticizer and the outer surface such that migration of the plasticizer is reduced for enhancing the bonding at a second interface between the cable jacket and the heat shrink tubing;

wherein the plasma treatment modifies the portion of the outer surface by cross linking the PVC.

2. The optical fiber assembly of claim 1, wherein the plasma treatment modifies a portion of the outer surface of the cable jacket to a depth between 1 nanometer (nm) and 5 nm.

3. The optical fiber assembly of claim 1, wherein the plasma treatment modifies about 3 nm of the cable jacket.

4. The optical fiber assembly of claim 1, wherein the plasma treatment uses at least one of inert gases, air, nitrogen, or oxygen.

5. The optical fiber assembly of claim 4, wherein the plasma treatment uses nitrogen gas.

6. The optical fiber assembly of claim 1, wherein the plasma treatment increases an unsaturation of the plasticizer.

7. The optical fiber assembly of claim 1, wherein the heat shrink tubing at least partially surrounding the cable jacket about the portion that has been plasma treated, and wherein a bonding between the cable jacket and the heat shrink tubing can withstand an initial tensile load of up to 275 N.

8. The optical fiber assembly of claim 1, wherein the bonding between the cable jacket and the heat shrink tubing can withstand an aged tensile load of up to 275 N after the plasma treatment and aging at 85° C. and a relative humidity of 85 for four weeks.

9. A method of improving adhesion of a cable comprising:
applying a cable jacket about an optical fiber, wherein the cable jacket comprises a plasticizer and an outer surface;
treating a portion of the outer surface of the cable jacket with a plasma treatment such that the plasma treatment modifies the portion of the cable jacket to reduce migration of the plasticizer for enhancing the bonding at the portion of the outer surface of the cable jacket, wherein the plasma treatment is applied absent a vacuum process at atmospheric conditions; and
applying a heat shrink tubing about the portion of the outer surface of the cable jacket;
wherein the plasma treatment is applied at a power between 200 Watts and 1000 Watts at a time interval between 10 seconds and 20 seconds.

10. The method of claim 9, wherein the plasma treatment uses at least one inert gas and at least one of air, nitrogen, or oxygen.

11. The method of claim 9, wherein the plasma treatment comprises a gas flow rate of between 40 standard cubic centimeters per minute (sccm) and 200 sccm of nitrogen.

12. The method of claim 9, wherein the power is between 100 W to 500 W at a time interval between 10 seconds and 20 seconds.

13. The method of claim 9, wherein the cable jacket is made of PVC and wherein after the plasma treatment, the cable jacket undergoes crosslinking and increasing unsaturation.

14. The method of claim 9, wherein the plasma treatment is applied by atmospheric pressure chemical vapor deposition (APCVD).

15. A method of improving adhesion of a cable connector comprising:
applying a cable jacket onto an optical fiber, wherein the cable jacket comprises a plasticizer and polyvinyl chloride (PVC), the cable jacket is configured to receive a heat shrink tubing; and
treating the cable jacket and the plasticizer with a plasma treatment such that the plasma treatment modifies the plasticizer and the outer surface of the cable jacket to minimize plasticizer migration, wherein the plasma treatment is applied onto the cable jacket at a depth between 1 nm and 5 nm from an outer surface of the cable jacket, wherein the plasma treatment is applied absent a vacuum process at atmospheric conditions and includes a first application of at least one inert gas and a second application of at least one of air, nitrogen, or oxygen; and
applying the heat shrink tubing after treating the cable jacket to create an environmental seal at an interface of the cable jacket and the heat shrink tubing;
wherein the plasma treatment comprises a gas flow rate of between 40 standard cubic centimeters per minute (sccm) and 200 sccm of nitrogen and between 40 standard liters per minute (SLM) and 200 SLM.

16. The method of claim 15, wherein the plasma treatment modifies the cable jacket at a depth of about 3 nm from the outer surface of the cable jacket.

17. The method of claim 15, further comprising coupling a boot and a connector onto the cable jacket.

18. The method of claim 15, wherein the plasma treatment modifies the plasticizer by increasing unsaturation of the plasticizer.

19. The method of claim 15, wherein the plasticizer is selected from the group consisting of: phthalate, Dimethyl phthalate (DMP), Diethyl phthalate (DEP), Dibutyl phthalate (DBP), Butyl octyl phthalate (BOP), diisohexyl phthalate (DHP), Diisoheptyl phthalate (DIHP), Heptyl nonyl phthalate (79P), Heptyl nonyl undecyl phthalate (711P), Diisooctyl phthalate (DIOP), di-2-ethylhexyl phthalate (DOP), (n-hexyl, octyl, decyl) phthalate (610), (n-octyl, decyl) phthalate (810P), Diisodecyl phthalate (DIDP), Diundecyl phthalate (DUP), Butyl benzyl phthalate (BBP), and Alkyl benzyl phthalate.

20. The method of claim 15, wherein the plasma treatment modifies the cable jacket by cross-linking the PVC or increasing unsaturation of the cable jacket.

21. An optical fiber assembly comprising:
an optical fiber;
a cable jacket surrounding the optical fiber, the cable jacket comprising a polyvinylchloride (PVC) and a plasticizer;
a fiber optic connector comprising a rear housing; and
a heat shrink tubing surrounding and contacting the rear housing of the fiber optic connector and an outer surface of the cable jacket to create an environmental seal at an interface between the fiber optic connector and the cable jacket;
wherein the cable jacket receives a plasma treatment on a portion of the outer surface of the cable jacket, wherein the plasma treatment modifies the plasticizer and the outer surface such that migration of the plasticizer is reduced for enhancing the bonding at a second interface between the cable jacket and the heat shrink tubing;
wherein the heat shrink tubing at least partially surrounding the cable jacket about the portion that has been plasma treated, and wherein a bonding between the cable jacket and the heat shrink tubing can withstand an initial tensile load of up to 275 N.

22. An optical fiber assembly comprising:
an optical fiber;
a cable jacket surrounding the optical fiber, the cable jacket comprising a polyvinylchloride (PVC) and a plasticizer;
a fiber optic connector comprising a rear housing; and
a heat shrink tubing surrounding and contacting the rear housing of the fiber optic connector and an outer surface of the cable jacket to create an environmental seal at an interface between the fiber optic connector and the cable jacket;
wherein the cable jacket receives a plasma treatment on a portion of the outer surface of the cable jacket, wherein the plasma treatment modifies the plasticizer and the outer surface such that migration of the plasticizer is reduced for enhancing the bonding at a second interface between the cable jacket and the heat shrink tubing;
wherein the bonding between the cable jacket and the heat shrink tubing can withstand an aged tensile load of up to 275 N after the plasma treatment and aging at 85° C. and a relative humidity of 85 for four weeks.

23. The method of claim 9, wherein the optical fiber assembly further includes a heat shrink tubing at least partially surrounding the cable jacket about the portion that has been plasma treated, and wherein a bonding between the cable jacket and the heat shrink tubing can withstand an initial tensile load of up to 275 N.

24. The method of claim 9, wherein the bonding between the cable jacket and the heat shrink tubing can withstand an aged tensile load of up to 275 N after the plasma treatment and aging at 85° C. and a relative humidity of 85 for four weeks.

25. The method of claim 15, wherein the optical fiber assembly further includes a heat shrink tubing at least partially surrounding the cable jacket about the portion that has been plasma treated, and wherein a bonding between the cable jacket and the heat shrink tubing can withstand an initial tensile load of up to 275 N.

26. The method of claim 15, wherein the bonding between the cable jacket and the heat shrink tubing can withstand an aged tensile load of up to 275 N after the plasma treatment and aging at 85° C. and a relative humidity of 85 for four weeks.

* * * * *